(12) United States Patent
Piggott et al.

(10) Patent No.: US 9,899,711 B2
(45) Date of Patent: Feb. 20, 2018

(54) GRAPHITE THERMOELECTRIC AND/OR RESISTIVE THERMAL MANAGEMENT SYSTEMS AND METHODS

(71) Applicant: Gentherm Incorporated, Northville, MI (US)

(72) Inventors: Alfred Piggott, Novi, MI (US); David Scott Thomas, Royal Oak, MI (US); Daniel Charles Guerithault, Ann Arbor, MI (US)

(73) Assignee: GENTHERM INCORPORATED, Northville, MI (US)

( * ) Notice: Subject to any disclaimer, the term of this patent is extended or adjusted under 35 U.S.C. 154(b) by 0 days.

(21) Appl. No.: 15/510,663

(22) PCT Filed: Sep. 11, 2015

(86) PCT No.: PCT/US2015/049800
§ 371 (c)(1),
(2) Date: Mar. 10, 2017

(87) PCT Pub. No.: WO2016/040872
PCT Pub. Date: Mar. 17, 2016

(65) Prior Publication Data
US 2017/0200992 A1    Jul. 13, 2017

Related U.S. Application Data

(60) Provisional application No. 62/050,001, filed on Sep. 12, 2014.

(51) Int. Cl.
*H01M 10/613* (2014.01)
*H01M 10/615* (2014.01)
(Continued)

(52) U.S. Cl.
CPC .............. *H01M 10/613* (2015.04); *C09K 5/14* (2013.01); *H01M 2/1077* (2013.01);
(Continued)

(58) Field of Classification Search
CPC ............. H01M 10/613; H01M 10/615; H01M 10/625; H01M 10/6563; H01M 10/6572; H01M 2/1077
See application file for complete search history.

(56) References Cited

U.S. PATENT DOCUMENTS 6,257,329 B1   7/2001  Balzano
6,438,964 B1   8/2002  Giblin
(Continued)

FOREIGN PATENT DOCUMENTS

WO    WO 2014/134369    9/2014

OTHER PUBLICATIONS

International Search Report and Written Opinion received in PCT Application No. PCT/US2015/049800, dated Jan. 7, 2016.

*Primary Examiner* — Helen O Conley
(74) *Attorney, Agent, or Firm* — Knobbe, Martens, Olson & Bear LLP

(57) ABSTRACT

Disclosed embodiments include thermal management systems and methods configured to heat and/or cool an electrical device. Thermal management systems can include a heat spreader in thermal communication with a temperature sensitive region of the electrical device. The heat spreader can include the one or more pyrolytic graphite sheets. The heat spreader can include thermal/electrical elevators connecting the one or more pyrolytic graphite sheets. The systems can include a thermoelectric device in thermal communication with the heat spreader. Electric power can be (Continued)

directed to the heat spreader and/or thermoelectric device to provide controlled heating and/or cooling of the electrical device.

30 Claims, 22 Drawing Sheets

(51) Int. Cl.
    *H01M 10/6563*     (2014.01)
    *H01M 10/6572*     (2014.01)
    *H01M 10/625*     (2014.01)
    *H01M 2/10*     (2006.01)
    *C09K 5/14*     (2006.01)

(52) U.S. Cl.
    CPC ....... *H01M 10/615* (2015.04); *H01M 10/625* (2015.04); *H01M 10/6563* (2015.04); *H01M 10/6572* (2015.04)

(56) References Cited

U.S. PATENT DOCUMENTS

| | | |
|---|---|---|
| 8,163,647 B2 | 4/2012 | Kawabata et al. |
| 2010/0128439 A1 | 5/2010 | Tilak et al. |
| 2013/0216887 A1 | 8/2013 | Wayne et al. |
| 2014/0124176 A1 | 5/2014 | Zhamu et al. |

GRAPHITE THERMOELECTRIC AND/OR RESISTIVE THERMAL MANAGEMENT SYSTEMS AND METHODS

CROSS-REFERENCE TO RELATED APPLICATIONS

This application is the U.S. National Phase under 35 U.S.C. § 371 of International Application No. PCT/US2015/049800, filed Sep. 11, 2015, titled GRAPHITE THERMOELECTRIC AND/OR RESISTIVE THERMAL MANAGEMENT SYSTEMS AND METHODS, which claims the benefit under 35 U.S.C. § 119(e) of U.S. Provisional Application No. 62/050,001, filed Sep. 12, 2014, titled INTEGRATED GRAPHITE THERMOELECTRIC AND RESISTIVE THERMAL MANAGEMENT DEVICE AND METHODS, the entirety of each of which is incorporated herein by reference and made a part of this specification.

BACKGROUND

Field

The present disclosure relates generally to thermal management (e.g., heating and/or cooling) of electrical devices including but not limited to batteries.

Description of Related Art

Power electronics and other electrical devices, such as batteries, can be sensitive to overheating, cold temperatures, extreme temperatures, and operating temperature limits. The performance of such devices may be diminished, sometimes severely, when the devices are operated outside of recommended temperature ranges. In semiconductor devices, integrated circuit dies can overheat and malfunction. In batteries, including, for example, batteries used for automotive applications in electrified or electrical vehicles, battery cells and their components can degrade when overheated or overcooled. Such degradation can manifest itself in reduced battery storage capacity and/or reduced ability for the battery to be recharged over multiple duty cycles.

High performance batteries for use in large systems (including, for example, lithium based batteries used in electrical vehicles) have certain properties that make thermal management of the batteries and/or containment system desirable. Charging characteristics of high performance batteries change at elevated temperatures and can cause the cycle life of the batteries to decrease significantly if they are charged or discharged at a temperature outside of an optimum range (e.g., too high or too low of a temperature). For example, the cycle life of some lithium based batteries decreased by over 50% if they are repeatedly charged at about 50° C. Since cycle life can be reduced by a large amount, the lifetime cost of batteries can be greatly increased if charging temperatures are not controlled within proper limits. Also, some high performance batteries can exhibit reduced performance and can be possibly damaged if charged or operated at too low of temperatures, such as below about −30° C. Furthermore, high performance batteries and arrays of high performance batteries can experience thermal events from which the batteries can be permanently damaged or destroyed, and over temperature condition can even result in fires and other safety related events.

This background is provided to introduce a brief context for the Summary and Detailed Description that follow. This Background is not intended to be viewed as limiting the claimed subject matter to implementations that solve any or all of the disadvantages or problems presented herein.

SUMMARY

It can be advantageous to manage the thermal conditions of power electronics and other electrical devices. Thermal management can reduce incidences of overheating, overcooling, and electrical device degradation. Certain embodiments described herein provide thermal management of devices that carry significant electric power and/or require high current and efficiency (e.g., power amplifiers, transistors, transformers, power inverters, insulated-gate bipolar transistors (IGBTs), electric motors, high power lasers and light-emitting diodes, batteries, and others). A wide range of solutions can be used to thermally manage such devices, including convective air and liquid cooling, conductive cooling, spray cooling with liquid jets, thermoelectric cooling of boards and chip cases, and other solutions. At least some embodiments disclosed herein provide at least one of the following advantages compared to existing techniques for heating or cooling electrical devices: higher power efficiency, lower or eliminated maintenance costs, greater reliability, longer service life, fewer components, fewer or eliminated moving parts, heating and cooling modes of operation, other advantages, or a combination of advantages.

Disclosed is an electrical device thermal management system. In some embodiments, the electrical device is a battery. A battery thermal management system can include one or more heat spreaders positioned between stacked battery cells. The one or more heat spreaders may have one or more pyrolytic graphite sheets that can function as a heater and/or cooler. In a heating mode of the battery thermal management system, electric current may flow through a heat spreader (e.g., through the graphite sheets and/or a substrate) such that the heat spreader functions as a resistance heater. In a cooling mode of the battery thermal management system, the heat spreader can transfer heat away from the battery cells to a heat sink.

In some embodiments, one or more thermoelectric devices can be attached to the one or more heat spreaders. In the heating mode, the one or more thermoelectric devices can transfer heat from a heat source into the one or more heat spreaders that transfer heat into the battery cells. In a cooling mode, the one or more thermoelectric devices can transfer heat to a heat sink from the one or more heat spreaders that transfer heat from the battery cells.

In some embodiments, one or more thermal/electrical connectors can be positioned between graphite sheets of a heat spreader (e.g. thermal/electrical connectors extending orthogonal to a plane extending substantially parallel to the graphite sheets). The one or more thermal/electrical connectors transfer heat or electrons between layers of graphite sheets (e.g. orthogonal to the parallel plane) to enhance thermal/electrical efficiency of the heat spreader. The heat spreader can include one or more connections to other components of the electrical device and/or thermal management system. The one or more connections of the heat spreader can include thermal/electrical connectors to enhance thermal/electrical communication efficiency of the heat spreader with other components of the system.

According to this disclosure, a thermoelectric battery thermal management system configured to manage temperature of a battery cell includes one or more the following: a heat spreader in thermal communication with a temperature sensitive region of a battery cell; a thermoelectric device comprising a main side and a waste side, the thermoelectric device configured to transfer thermal energy between the main side and the waste side of the thermoelectric device upon application of electric current to the thermoelectric device; the main side of the thermoelectric device is in thermal communication with the heat spreader to heat or cool the battery cell by adjusting a polarity of electric current delivered to the thermoelectric device; and/or a thermal management controller configured to operate in a heating mode or a cooling mode. The heat spreader includes one or more of the following: pyrolytic graphite in thermal communication with the temperature sensitive region of the battery cell, the pyrolytic graphite comprising a plurality of graphite layers extending substantially in parallel along the heat spreader and configured to transfer thermal energy and electric current along a plane substantially parallel to the graphite layers; a plurality of thermal elevators between the plurality of graphite layers, the thermal elevators configured to transfer thermal energy between the plurality of graphite layers and configured to transfer thermal energy substantially orthogonal to the plane; and/or a conductor in thermal communication with the pyrolytic graphite and the plurality of thermal elevators, the conductor in electrical communication with the pyrolytic graphite to heat the battery cell upon application of electric current through the pyrolytic graphite via the conductor. In the heating mode, the battery cell is heated by the heat spreader transferring thermal energy to the temperature sensitive region of the battery cell when electric current is applied to the heat spreader via the conductor, when electric current is applied to the thermoelectric device in a first polarity, or when electric current is applied to both the heat spreader via the conductor and the thermoelectric device in the first polarity. In the cooling mode, the battery cell is cooled by the heat spreader transferring thermal energy away from the temperature sensitive region of the battery cell when electric current is applied to the thermoelectric device in a second polarity.

In some embodiments, the thermoelectric battery thermal management system further includes one or more of the following: the heat spreader comprises a first side and a second side, the first side substantially opposite the second side; the heat spreader comprises an other conductor in thermal and electrical communication with the pyrolytic graphite on the second side of the heat spreader, the conductor on the first side of the heat spreader; in the heating mode, the battery cell is heated when electric current is applied to the pyrolytic graphite via the conductor and the other conductor such that electric current flows along the plurality of graphite layers from the first side to the second side of the heat spreader; the other conductor comprises an electrical junction configured to electrically connect to a printed circuit board comprising the thermal management controller, the electrical junction configured to deliver electric current to the heat spreader; the battery cell and the heat spreader are positioned in a battery case; the conductor is configured to attach to the battery case to physically fix the heat spreader relative to the battery case; a thermal interface on the battery case and configured to mate with the conductor; the conductor comprises a first mechanical connector; the thermal interface comprises a second mechanical connector configured to mate with the first mechanical connector to attach the conductor to the battery case; the first mechanical connector comprises a male dovetail connector and the second mechanical connector comprises a female dovetail connector configured to accept the male dovetail connector to attach the conductor to the battery case; the battery case comprises a thermal window configured to transfer thermal energy in and out of the battery case, the thermal window in thermal communication with the thermal interface; the battery case comprises a thermal substrate in the thermal window, the thermal substrate configured to transfer thermal energy in and out of the battery case while providing a physical barrier into the battery case; the main side of the thermoelectric device is in thermal communication with the thermal substrate to provide the thermal communication between the main side of the thermoelectric device and the heat spreader via the conductor and the thermal interface; the thermoelectric device is positioned outside of the battery case; a blower and duct assembly attached to the battery case and configured to push or pull air across the waste side of the thermoelectric device; the thermal management controller is configured to optimize system efficiency such that airflow from a blower of the blower and duct assembly is increased or decreased to match heating or cooling requirements of the battery cell; a blower and duct assembly in thermal communication with the thermoelectric device and configured to push or pull air across the waste side of the thermoelectric device; the thermal management controller is configured to optimize system efficiency such that airflow from a blower of the blower and duct assembly is increased or decreased to match heating or cooling requirements of the battery cell; the waste side of the thermoelectric device is in thermal communication with air via a waste heat exchanger; the waste side of the thermoelectric device comprises the waste heat exchanger; the heat spreader comprises a plurality of breaks in the plurality of graphite layers, the plurality of breaks configured to increase a conduction path for electric current through the heat spreader to increase resistive heating capacity of the heat spreader; the plurality of graphite layers are crinkled to increase a length of a surface of at least one graphite layer of the plurality of graphite layers, the increased length of the surface of the at least one graphite layer configured to increase a conduction path for electric current through the at least one graphite layer to increase resistive heating capacity of the heat spreader; the conductor comprises at least some of the plurality of thermal elevators such that the plurality of thermal elevators is substantially on ends of the heat spreader; the heat spreader is in thermal communication with a temperature sensitive region of an other battery cell on a side of the heat spreader opposite a side of the heat spreader in thermal communication with the temperature sensitive region of the battery cell; at least some of the plurality of thermal elevators extend substantially a length between the sides of the heat spreader in thermal communication with the temperature sensitive regions of the battery cell and the other battery cell; the at least some of the plurality of thermal elevators extending between the sides of the heat spreader are in direct thermal communication with the battery cell and the other battery cell to reduce thermal contact resistance associated with the heat spreader; the plurality of thermal elevators comprises a metallic material configured to transfer electric current between the plurality of graphite layers and the conductor; and/or the conductor extends substantially an entirety of a dimension of the heat spreader to provide structural integrity to the heat spreader.

According to this disclosure, a battery thermal management system configured to heat or cool a battery cell includes one or more of the following: a heat spreader in thermal communication with a battery cell; and/or a thermoelectric device comprising a main side and a waste side, the thermoelectric device configured to transfer thermal energy between the main side and the waste side of the thermoelectric device upon application of electric current to the thermoelectric device; the main side of the thermoelectric device is in thermal communication with the heat spreader to heat or cool the battery cell by adjusting a polarity of electric current delivered to the thermoelectric device. The heat spreader includes one or more of the following: a pyrolytic graphite sheet configured to transfer thermal energy and electric current along the pyrolytic graphite sheet; and/or a conductor in thermal and electrical communication with the pyrolytic graphite sheet, the conductor in electrical communication with the pyrolytic graphite sheet to heat the battery cell upon application of electric current to the pyrolytic graphite sheet via the conductor, the conductor in thermal communication with the pyrolytic graphite sheet to transfer thermal energy to and from the pyrolytic graphite sheet. The battery cell is heated by the heat spreader transferring thermal energy to the battery cell when electric current is applied to the heat spreader via the conductor, or when electric current is applied to the thermoelectric device in a first polarity, or when electric current is applied to both the heat spreader via the conductor and the thermoelectric device in the first polarity. The battery cell is cooled by the heat spreader transferring thermal energy away from the battery cell when electric current is applied to the thermoelectric device in a second polarity.

In some embodiments, the battery thermal management system further includes one or more of the following: the heat spreader comprises a first side and a second side, the first side substantially opposite the second side; the heat spreader comprises an other conductor in thermal and electrical communication with the pyrolytic graphite sheet; the battery cell is heated when electric current is applied to the pyrolytic graphite sheet via the conductor and the other conductor such that electric current flows along the pyrolytic graphite sheet from the first side to the second side of the heat spreader; the other conductor comprises an electrical junction configured to electrically connect to a printed circuit board, the electrical junction configured to deliver electric current to the heat spreader; the battery cell and the heat spreader are positioned in a battery enclosure; the conductor is configured to connect with the battery enclosure to secure the heat spreader to the battery enclosure; a thermal interface on the battery enclosure and configured to mate with the conductor; the conductor comprises a first mechanical connector; the thermal interface comprises a second mechanical connector configured to mate with the first mechanical connector to attach the conductor to the battery enclosure; the first mechanical connector comprises a male dovetail connector and the second mechanical connector comprises a female dovetail connector configured to accept the male dovetail connector to attach the conductor to the battery enclosure; the battery enclosure comprises a thermal window configured to transfer thermal energy in and out of the battery enclosure; the battery enclosure comprises a thermal substrate in the thermal window, the thermal substrate configured to transfer thermal energy in and out of the battery enclosure while providing a physical barrier into the battery enclosure; the thermoelectric device is in thermal communication with the thermal substrate to provide the thermal communication between the thermoelectric device and the heat spreader; the thermoelectric device is positioned outside of the battery enclosure; a blower and duct assembly attached to the battery enclosure and configured to push or pull air across the waste side of the thermoelectric device; a blower of the blower and duct assembly is configured to optimize system efficiency such that airflow is increased or decreased to match heating or cooling requirements of the battery cell; a blower and duct assembly in thermal communication with the thermoelectric device and configured to push or pull air across the waste side of the thermoelectric device; a blower of the blower and duct assembly is configured to optimize system efficiency such that airflow is increased or decreased to match heating or cooling requirements of the battery cell; the waste side of the thermoelectric device is in thermal communication with air via a waste heat exchanger; the waste side of the thermoelectric device comprises the waste heat exchanger; the heat spreader comprises a break in the pyrolytic graphite sheet, the break configured to increase a travel path for electric current through the heat spreader to increase resistive heating capacity of the heat spreader; the pyrolytic graphite sheet is crinkled to increase a length of a surface of the pyrolytic graphite sheet, the increased length of the surface of the pyrolytic graphite sheet configured to increase a travel path for electric current through the pyrolytic graphite sheet to increase resistive heating capacity of the heat spreader; the conductor extends substantially an entirety of a dimension of the heat spreader to provide structural integrity to the heat spreader; the heat spreader further comprises at least one other pyrolytic graphite sheet in thermal and electrical communication with the conductor, the at least one other pyrolytic graphite sheet extending substantially in parallel with the pyrolytic graphite sheet; the conductor is in electrical communication with the at least one other pyrolytic graphite sheet to heat the battery cell upon application of electric current to the at least one other pyrolytic graphite sheet via the conductor, the conductor in thermal communication with the at least one other pyrolytic graphite sheet to transfer thermal energy to and from the at least one other pyrolytic graphite sheet; the heat spreader further comprises a thermal connector between the pyrolytic graphite sheet and the at least one other pyrolytic graphite sheet, the thermal connector configured to transfer thermal energy between the pyrolytic graphite sheet and the at least one other pyrolytic graphite sheet; the conductor comprises the thermal connector; the thermal connector comprises a metallic material configured to transfer electric current between the pyrolytic graphite sheet and the at least one other pyrolytic graphite sheet; the heat spreader is in thermal communication with an other battery cell on a side of the heat spreader opposite a side of the heat spreader in thermal communication with the battery cell; the thermal connector is positioned between the sides of the heat spreader in thermal communication with the battery cell and the other battery cell; the thermal connector is in direct thermal communication with the battery cell and the other battery cell to reduce thermal contact resistance associated with the heat spreader; the heat spreader further comprises a metallic substrate in thermal communication with the pyrolytic graphite sheet; the pyrolytic graphite sheet is in thermal communication with the battery cell such that the pyrolytic graphite sheet functions as thermal interface between the battery cell and the metallic substrate; the pyrolytic graphite sheet extends along a surface of the metallic substrate on at least two sides of the metallic substrate; the pyrolytic graphite sheet extends at least half a cross-sectional perimeter of the metallic substrate; the main side of the thermoelectric device is positioned over at least a portion of the metallic substrate; the pyrolytic graphite sheet extends to be between the main side of the thermoelectric device and the metallic substrate to provide a thermal interface between the thermoelectric device and the metallic substrate, the thermal interface configured to transfer thermal energy between the main side of the thermoelectric device and the metallic substrate; the battery cell is heated by the heat spreader transferring thermal energy to the battery cell when electric current is applied to metallic substrate via the conductor; and/or the battery is cooled by the heat spreader transferring thermal energy away from the battery cell via the pyrolytic graphite sheet and the conductor when electric current is applied to the thermoelectric device in the second polarity.

According to this disclosure, a heat spreader assembly for managing temperature of an electrical device includes one or more of the following: a graphite sheet in thermal communication with an electrical device, the graphite sheet configured to transfer thermal energy and electric current along the graphite sheet; and/or a conductor in thermal and electrical communication with the graphite sheet, the conductor in electrical communication with the graphite sheet to heat the electrical device upon application of electric current to the graphite sheet via the conductor, the conductor in thermal communication with the graphite sheet to transfer thermal energy to and from the graphite sheet. The electrical device is heated by the graphite sheet transferring thermal energy to the electrical device when electric current is applied to the heat spreader via the conductor. The electrical device is cooled by the graphite sheet transferring thermal energy away from the electrical device.

In some embodiments, the heat spreader assembly further includes one or more of the following: an other conductor in thermal and electrical communication with the graphite sheet; the electrical device is heated when electric current is applied to the graphite sheet via the conductor and the other conductor such that electric current flows along the graphite sheet; the graphite sheet comprises a first side and a second side, the first side substantially opposite the second side; the conductor is on the first side, and the other conductor is on the second side; the other conductor comprises an electrical junction configured to electrically connect to a printed circuit board comprising a controller configured to manage temperature of the electrical device, the electrical junction configured to deliver electric current to the heat spreader; the heat spreader assembly is positioned in an electrical device enclosure; the conductor is configured to connect with the electrical device enclosure to secure the heat spreader assembly to the electrical device enclosure; a thermal interface on the electrical device enclosure and configured to mate with the conductor; the conductor comprises a first mechanical connector; the thermal interface comprises a second mechanical connector configured to mate with the first mechanical connector to attach the conductor to the electrical device enclosure; the first mechanical connector comprises a male dovetail connector and the second mechanical connector comprises a female dovetail connector configured to accept the male dovetail connector to attach the conductor to the electrical device enclosure; the electrical device enclosure comprises a thermal window configured to transfer thermal energy in and out of the electrical device enclosure; the electrical device enclosure comprises a thermal substrate in the thermal window, the thermal substrate configured to transfer thermal energy in and out of the electrical device enclosure while providing a physical barrier into the electrical device enclosure; a thermoelectric device is in thermal communication with the thermal substrate to provide heating or cooling to the electrical device via the heat spreader; the thermoelectric device is positioned outside of the electrical device enclosure; a thermoelectric device is in thermal communication with the graphite sheet; the electrical device by the graphite sheet when electric current is applied to the thermoelectric device in a first polarity; the electrical device is cooled by the graphite sheet when electric current is applied to the thermoelectric device in a second polarity; the graphite sheet comprises a break in covalent bonds in the graphite sheet, the cut configured to increase a travel path for electric current through the graphite sheet to increase resistive heating capacity of the graphite sheet; the graphite sheet is crinkled to increase a length of the graphite sheet, the increased length of graphite sheet configured to increase a travel path for electric current through the graphite sheet to increase resistive heating capacity of the graphite sheet; the conductor extends substantially an entirety of a dimension of the graphite sheet to provide structural integrity to the graphite sheet; at least one other graphite sheet in thermal and electrical communication with the conductor; the conductor is in electrical communication with the at least one other graphite sheet to heat the electrical device upon application of electric current to the at least one other graphite sheet via the conductor, the conductor in thermal communication with the at least one other graphite sheet to transfer thermal energy to and from the at least one other graphite sheet; the graphite sheet and the at least one other graphite extend substantially in parallel in the heat spreader assembly; a thermal connector between the graphite sheet and the at least one other graphite sheet, the thermal connector configured to transfer thermal energy between the graphite sheet and the at least one other graphite sheet; the conductor comprises the thermal connector; the thermal connector comprises a metallic material configured to transfer electric current between the graphite sheet and the at least one other graphite sheet; a metallic substrate in thermal communication with the graphite sheet; the graphite sheet is in thermal communication with the electrical device such that the graphite sheet is configured to transfer thermal energy between the main side of the thermoelectric device and the metallic substrate; the graphite sheet extends along a surface of the metallic substrate on at least two sides of the metallic substrate; the graphite sheet extends at least half a cross-sectional perimeter of the metallic substrate; the electrical device is heated when electric current is applied to metallic substrate via the conductor; the graphite sheet comprises one or more pyrolytic graphite layers; the electrical device comprises a battery cell; and/or the graphite sheet is in thermal communication with a temperature sensitive region of the electrical device.

According to this disclosure, a method of manufacturing a battery thermal management system for heating or cooling a battery cell includes one or more of the following: thermally connecting a heat spreader to a battery cell; and/or thermally connecting a main side of a thermoelectric device to the heat spreader to heat or cool the battery cell by adjusting a polarity of electric current delivered to the thermoelectric device, the thermoelectric device configured to transfer thermal energy between the main side and a waste side of the thermoelectric device upon application of electric current to the thermoelectric device. The heat spreader includes one or more of the following: a pyrolytic graphite sheet configured to transfer thermal energy and electric current along the pyrolytic graphite sheet; and/or a conductor in thermal and electrical communication with the pyrolytic graphite sheet, the conductor in electrical communication with the pyrolytic graphite sheet to heat the battery cell upon application of electric current to the pyrolytic graphite sheet via the conductor, the conductor in thermal communication with the pyrolytic graphite sheet to transfer thermal energy to and from the pyrolytic graphite sheet. The battery cell is heated by the heat spreader transferring thermal energy to the battery cell when electric current is applied to the heat spreader via the conductor, or when electric current is applied to the thermoelectric device in a first polarity, or when electric current is applied to both the heat spreader via the conductor and the thermoelectric device in the first polarity. The battery cell is cooled by the heat spreader transferring thermal energy away from the battery cell when electric current is applied to the thermoelectric device in a second polarity.

In some embodiments, the method of manufacturing a battery thermal management system further includes one or more of the following: the heat spreader comprises a first side and a second side, the first side substantially opposite the second side; the heat spreader comprises an other conductor in thermal and electrical communication with the pyrolytic graphite sheet; the battery cell is heated when electric current is applied to the pyrolytic graphite sheet via the conductor and the other conductor such that electric current flows along the pyrolytic graphite sheet from the first side to the second side of the heat spreader; the other conductor comprises an electrical junction configured to electrically connect to a printed circuit board, the electrical junction configured to deliver electric current to the heat spreader; positioning the battery cell and the heat spreader in a battery enclosure and connecting the conductor with the battery enclosure to secure the heat spreader to the battery enclosure; connecting a thermal interface to the battery enclosure, the thermal interface configured to mate with the conductor; the conductor comprises a first mechanical connector; the thermal interface comprises a second mechanical connector configured to mate with the first mechanical connector to attach the conductor to the battery enclosure; the first mechanical connector comprises a male dovetail connector and the second mechanical connector comprises a female dovetail connector configured to accept the male dovetail connector to attach the conductor to the battery enclosure; positioning a thermal window in the battery enclosure, the thermal window configured to transfer thermal energy in and out of the battery enclosure; connecting a thermal substrate to the battery enclosure in the thermal window, the thermal substrate configured to transfer thermal energy in and out of the battery enclosure while providing a physical barrier into the battery enclosure; thermally connecting the thermoelectric device with the thermal substrate to thermally connect the thermoelectric device to the heat spreader; positioning the thermoelectric device outside of the battery enclosure; connecting a blower and duct assembly to the battery enclosure, the blower and duct assembly configured to push or pull air across the waste side of the thermoelectric device, and further comprising connecting a blower in the blower and duct assembly, the blower configured to optimize system efficiency such that airflow is increased or decreased to match heating or cooling requirements of the battery cell; connecting a blower and duct assembly in thermal communication with the thermoelectric device and configured to push or pull air across the waste side of the thermoelectric device, and further comprising connecting a blower in the blower and duct assembly, the blower configured to optimize system efficiency such that airflow is increased or decreased to match heating or cooling requirements of the battery cell; the waste side of the thermoelectric device is in thermal communication with air via a waste heat exchanger; the waste side of the thermoelectric device comprises the waste heat exchanger; the heat spreader comprises a break in the pyrolytic graphite sheet, the break configured to increase a travel path for electric current through the heat spreader to increase resistive heating capacity of the heat spreader; the pyrolytic graphite sheet is crinkled to increase a length of a surface of the pyrolytic graphite sheet, the increased length of the surface of the pyrolytic graphite sheet configured to increase a travel path for electric current through the pyrolytic graphite sheet to increase resistive heating capacity of the heat spreader; the conductor extends substantially an entirety of a dimension of the heat spreader to provide structural integrity to the heat spreader; the heat spreader further comprises at least one other pyrolytic graphite sheet in thermal and electrical communication with the conductor, the at least one other pyrolytic graphite sheet extending substantially in parallel with the pyrolytic graphite sheet; the conductor is in electrical communication with the at least one other pyrolytic graphite sheet to heat the battery cell upon application of electric current to the at least one other pyrolytic graphite sheet via the conductor, the conductor in thermal communication with the at least one other pyrolytic graphite sheet to transfer thermal energy to and from the at least one other pyrolytic graphite sheet; the heat spreader further comprises a thermal connector between the pyrolytic graphite sheet and the at least one other pyrolytic graphite sheet, the thermal connector configured to transfer thermal energy between the pyrolytic graphite sheet and the at least one other pyrolytic graphite sheet; the conductor comprises the thermal connector; the thermal connector comprises a metallic material configured to transfer electric current between the pyrolytic graphite sheet and the at least one other pyrolytic graphite sheet; thermally connecting the heat spreader to an other battery cell on a side of the heat spreader opposite a side of the heat spreader in thermally connected with the battery cell; the thermal connector is positioned between the sides of the heat spreader in thermal communication with the battery cell and the other battery cell; the thermal connector is in direct thermal communication with the battery cell and the other battery cell to reduce thermal contact resistance associated with the heat spreader; the heat spreader further comprises a metallic substrate in thermal communication with the pyrolytic graphite sheet; the pyrolytic graphite sheet is in thermal communication with the battery cell such that the pyrolytic graphite sheet functions as thermal interface between the battery cell and the metallic substrate; the pyrolytic graphite sheet extends along a surface of the metallic substrate on at least two sides of the metallic substrate; the pyrolytic graphite sheet extends at least half a cross-sectional perimeter of the metallic substrate; the main side of the thermoelectric device is positioned over at least a portion of the metallic substrate, and the pyrolytic graphite sheet extends to be between the main side of the thermoelectric device and the metallic substrate to provide a thermal interface between the thermoelectric device and the metallic substrate, the thermal interface configured to transfer thermal energy between the main side of the thermoelectric device and the metallic substrate; the battery cell is heated by the heat spreader transferring thermal energy to the battery cell when electric current is applied to metallic substrate via the conductor; and/or the battery is cooled by the heat spreader transferring thermal energy away from the battery cell via the pyrolytic graphite sheet and the conductor when electric current is applied to the thermoelectric device in the second polarity.

The foregoing is a summary and contains simplifications, generalization, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The foregoing is a summary and contains simplifications, generalization, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

DETAILED DESCRIPTION

Figure 1:
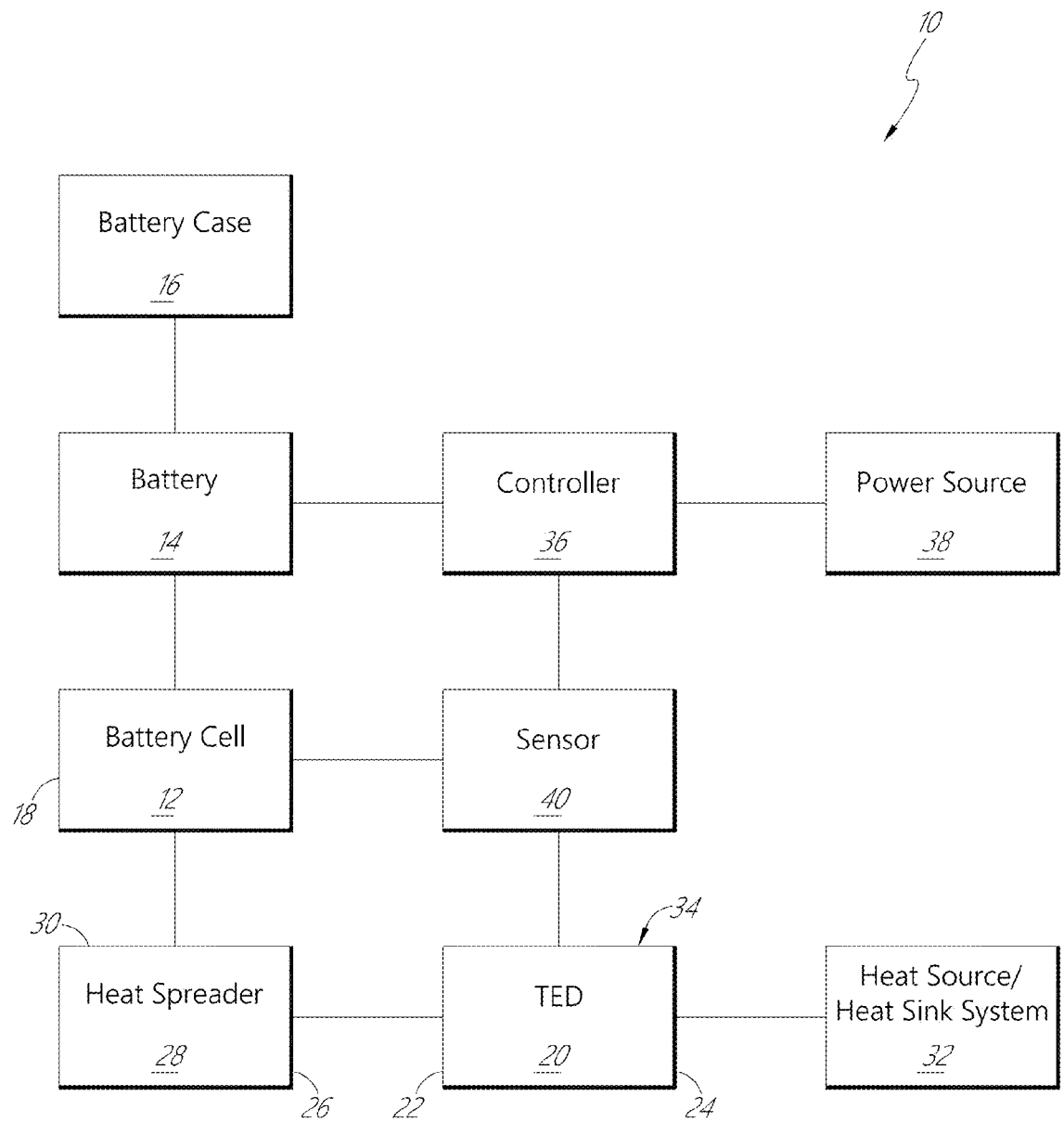
FIG. 1 is a schematic illustration of an embodiment of an electrical device thermal management system.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and made a part of this disclosure.

In particular, embodiments disclosed herein pertain to thermal management (e.g., heating and/or cooling) of electrical devices including but not limited to batteries with or without thermoelectric systems.

Thermoelectric (TE) systems can be operated in either heating/cooling or power generation modes. In the former, electric current is passed through a TE device to pump the heat from the cold side to the hot side or vice versa. In the latter, a heat flux driven by a temperature gradient across a TE device is converted into electricity. In both modalities, the performance of the TE device is largely determined by the figure of merit of the TE material and by the parasitic (dissipative) losses throughout the system. Working elements in the TE device are typically p-type and n-type semiconducting materials.

A thermoelectric system or device as described herein can be a thermoelectric generator (TEG) which uses the temperature difference between two fluids, two solids (e.g., rods), or a solid and a fluid to produce electrical power via thermoelectric materials. Alternatively, a thermoelectric system or device as described herein can be a heater, cooler, or both which serves as a solid state heat pump used to move heat from one surface to another, thereby creating a temperature difference between the two surfaces via the thermoelectric materials. Each of the surfaces can be in thermal communication with or comprise a solid, a liquid, a gas, or a combination of two or more of a solid, a liquid, and a gas, and the two surfaces can both be in thermal communication with a solid, both be in thermal communication with a liquid, both be in thermal communication with a gas, or one can be in thermal communication with a material selected from a solid, a liquid, and a gas, and the other can be in thermal communication with a material selected from the other two of a solid, a liquid, and a gas.

The thermoelectric system can include a single thermoelectric device (TED) or a group of thermoelectric devices (TEDs) depending on usage, power output, heating/cooling capacity, coefficient of performance (COP) or voltage. Although the examples described herein may be described in connection with a heating/cooling system, the described features can be utilized with either a power generator or a heating/cooling system.

The term "thermal communication" is used herein in its broad and ordinary sense, describing two or more components that are configured to allow heat or thermal energy transfer from one component to another (e.g., between components) that performs a desired function or achieves a desired result. For example, such thermal communication can be achieved, without loss of generality, by snug contact between surfaces at an interface; one or more heat transfer materials or devices between surfaces; a connection between solid surfaces using a thermally conductive material system, wherein such a system can include pads, thermal grease, paste, one or more working fluids, or other structures with high thermal conductivity between the surfaces (e.g., heat exchangers); other suitable structures; or combinations of structures. Substantial thermal communication can take place between surfaces that are directly connected (e.g., contact each other to provide direct thermal communication, but may include, for example, thermal grease or the like) or indirectly connected via one or more interface materials. "Thermal communication" does not include incidental heat (e.g., thermal energy) transfer between two or more separate components unless heat transfer between the two or more components occurs via one or more working fluids configured to flow when heat transfer is needed (e.g., a working fluid circulated between the two or more components) and/or heat pipe. "Thermal communication" does not include possible heat transfer between two or more components that are separated by a fluid that is not circulated between the two or more components, such as for example, air that is not moved by, for example, a blower relative to the two or more components.

As used herein, the terms "shunt," "cold plate," "heat spreader," "heat/hot plate," "fin," and "heat exchanger" have their broadest reasonable interpretation, including but not limited to a component (e.g., a thermally conductive device or material) that allows heat or thermal energy to flow from one portion of the component to another portion of the component. In some embodiments, heat spreader can be a heat exchanger that functions as a cold plate, heat/hot plate, and/or fin depending on the disclosed functionality. Shunts can be in thermal communication with one or more thermoelectric materials (e.g., one or more thermoelectric elements) and in thermal communication with one or more heat exchangers of the thermoelectric assembly or system. Shunts described herein can also be electrically conductive and in electrical communication with the one or more thermoelectric materials so as to also allow electrical current to flow from one portion of the shunt to another portion of the shunt (e.g., thereby providing electrical communication between multiple thermoelectric materials or elements). Heat exchangers (e.g., heat spreaders, tubes, and/or conduits) can be in thermal communication with the one or more shunts, one or more TEDs, and/or one or more working fluids of the thermoelectric assembly or system. Various configurations of one or more shunts and one or more heat exchangers can be used (e.g., one or more shunts and one or more heat exchangers can be portions of the same unitary element, one or more shunts can be in electrical communication with one or more heat exchangers, one or more shunts can be electrically isolated from one or more heat exchangers, one or more shunts can be in direct thermal communication with the thermoelectric elements, one or more shunts can be in direct thermal communication with the one or more heat exchangers, an intervening material can be positioned between the one or more shunts and the one or more heat exchangers). Furthermore, as used herein, the words "cold," "hot," "cooler," "hotter," "coldest," "hottest," and the like are relative terms, and do not signify a particular temperature or temperature range.

Embodiments disclosed herein include systems and methods capable of thermally managing an electrical device (e.g., battery) by applying direct or indirect thermoelectric (TE) cooling and/or heating to the electrical devices. Such devices can often benefit from thermal management. Some embodiments will be described with reference to particular electrical devices, such as, for example, batteries, battery casings and battery cells. However, at least some embodiments disclosed herein are capable of providing thermal management to other electrical devices, such as, for example, insulated-gate bipolar transistors (IGBTs), other electrical devices, or a combination of devices. At least some such devices can suffer from operation outside of a preferred temperature range. The operation of some embodiments is described with reference to a cooling mode of operation. However, some or all of the embodiments disclosed herein can have a heating mode of operation, as well. In some situations a heating mode of operation can be employed to maintain the temperature of an electrical device above a threshold temperature, under which the electrical device may degrade or exhibit impaired operation. TE devices are uniquely suited to provide both heating and cooling functions with minimum complications for system architecture.

Battery thermal management is desired to maintain vehicle batteries within an optimum temperature range. This maximizes both performance and useful life of the battery. Although the examples described herein may be described in connection with a heating/cooling system for a battery, the described features can be utilized with other electrical devices as described herein.

In general, for most battery chemistries, as temperatures rise, discharge time (capacity) increases, ability to deliver current increases and charging time decreases. For these metrics, high battery temperatures are generally favorable. However, for the metric of battery life, the opposite is generally true. High temperatures reduce useful battery life. It has been found that maintaining batteries within an ideal temperature range or prescribed temperature at the right time can balance battery life with other performance metrics.

Start-stop batteries may be located under the hood of a vehicle. The temperature under the hood of a vehicle is typically above the ideal or prescribed temperature range. To improve the useful life of the battery it is best to maintain the battery at lower temperatures than the under hood environment of a vehicle.

Different thermal management strategies have been devised for batteries, but thermoelectric thermal management can be beneficial over other thermal management strategies for many reasons. One advantage of TE thermal management is it places little or no other (e.g., additional) burden on the vehicle in terms of coolant hoses or refrigerant lines. Another advantage is electric power for the TE thermal management can be delivered by the battery itself making the system "stand-alone" or "in-line".

For lithium-ion start-stop batteries, rapid heating prior to engine start-up is generally helpful in boosting the current delivering ability of the battery cells. If this ability (e.g., rapid heating prior to engine start-up) is increased, the battery pack can be made smaller (e.g., less total amount of battery cells) at reduced cost and improve performance relative to competing products like lead acid batteries. To make the heating system practical, the heat must be delivered to the batteries at a high rate (e.g., heat flux) requiring a high power heating system.

There are a variety of ways in which TE devices can be used for electrical device cooling and/or heating tasks. As described herein, TE devices can include one or more TE elements, TE assemblies and/or TE modules. In some embodiments, a TE system can include a TE device, which comprises a first side and a second side opposite the first side. In some embodiments, the first side and second side can be a main surface and waste surface, or heating surface and cooling surface (or a main side and waste side, or heating side and cooling side). In certain embodiments, the main surface can control the temperature of a device under thermal management while the waste surface connects is connected to a heat source or heat sink. A TE device can be operably coupled with a power source. The power source can be configured to apply a voltage to the TE device. When voltage is applied in one direction, one side (e.g., the first side) creates heat while the other side (e.g., the second side) absorbs heat. Switching polarity of the circuit creates the opposite effect. In a typical arrangement, a TE device comprises a closed circuit that includes dissimilar materials. As a DC voltage is applied to the closed circuit, a temperature difference is produced at the junction of the dissimilar materials. Depending on the direction of the electric current, heat is either emitted or absorbed at a particular junction. In some embodiments, the TE device includes several solid state P- and N-type semi-conductor elements connected in series; or groups (e.g., modules) of P- and N-type semi-conductor elements connected in series, with the groups connected in a parallel and/or series configuration to provide operational robustness to the TE device.

In certain embodiments, the junctions are sandwiched between two electrical isolation members (e.g., ceramic plates), which can form the cold side and the hot side of the TE device. The cold side can be thermally coupled (directly or indirectly) to an object (e.g., electrical conductor, electrical device under thermal management, battery cell, heat spreader/fin, etc.) to be cooled and the hot side can be thermally coupled (directly or indirectly) to a waste heat removal system which dissipates heat to the environment. Any suitable technique can be used including, but not limited to a heat exchanger, heat sink, heat pipe and/or exposure to ambient air. In some embodiments, the hot side can be thermally coupled (directly or indirectly) to an object (e.g., electrical conductor, electrical device under thermal management, battery cell, heat spreader/fin, etc.) to be heated. Certain non-limiting embodiments are described below.

In some embodiments, a heat pipe can be provided as a waste heat removal or transport mechanism. Waste heat from a TE device can be dissipated in a heat sink. Examples of heat sinks include heat exchangers, waste streams, other structures for dissipating heat such as a battery case as discussed herein, and combinations of structures. A heat sink can be attached (directly or indirectly) to the waste side or surface of the TE device. The heat sink can be cooled by air, liquid, or, alternatively, it can be a solid member connecting the TE device with a bigger solid heat sink such as a battery case, car frame, or another structural element that dissipates heat effectively. However, in practical applications, such as, for example, a battery thermal management system, there can be packaging constraints that limit the possibility of bringing the cooling media close to the waste side of the TE device. Alternatively, a heat or thermal transport device may be used to move the heat from the waste side of the TE device to another location where heat dissipation may be implemented effectively.

In some embodiments, a heat transfer device or exchanger can be used to connect the waste side or surface of the TE device to a heat sink where the heat is ultimately dumped by, for example, air, liquid, or solid. Such a heat sink can be for example the liquid cooling circuit of the car, a radiator or an air cooled heat sink, ambient air, working fluid, fluid reservoir, or a solid body (e.g., battery case or car frame).

Electrical Device Thermal Management Systems

Electrical device thermal management systems, and in particular, battery thermal management systems (BTMS), can be used to control temperatures and monitor conditions of batteries and arrays of batteries to prevent battery failure and/or safety related failure. A BTMS can improve the overall conditions of battery operation by both managing the thermal environment and also being sufficiently reliable so that overall system performance is not degraded.

A variety of embodiments of battery thermal management systems are discussed herein to illustrate various configurations. The particular embodiments and examples are only illustrative and features described in one embodiment or example may be combined with other features described in other embodiments or examples. Accordingly, the particular embodiments and examples are not intended to be restrictive in any way.

In some embodiments, a BTMS includes at least one battery, battery case, battery cell, plate (e.g., heat spreader 28 as discussed herein) in contact with the cell, electrode, and/or battery array. In certain embodiments, a battery thermal management system can be used to both heat and cool batteries, battery cells, and/or battery arrays. For example, the battery thermal management system can be integrated with the at least one battery, the battery thermal management system can be integrated with an enclosure wherein the at least one battery or battery cell is contained, or the thermal management system can be positioned in thermal communication with the at least one battery or battery cell.

FIG. 1 is a schematic illustration of an embodiment of an electrical device thermal management system or battery thermal management system (BTMS) 10. As illustrated in FIG. 1, the BTMS 10 can include one or more battery cell(s) 12 of a battery 14. The battery cell(s) 12 include one or more electrodes 18. In some embodiments, the battery cell(s) 12 is enclosed by or housed in a battery case, casing, or enclosure 16 (or an electrical device enclosure). The BTMS 10 can further include one or more TEDs 20 each having a first side 22 (e.g., a main surface for providing heating or cooling to the battery cell(s) 12 via, for example, direct thermal communication or a main side heat exchanger) and a second side 24 (e.g., a waste surface for transferring thermal energy to or away from the TED 20 via, for example, direct thermal communication or a waste side heat exchanger). In some embodiments, the first side 22 is in thermal communication with a portion (e.g., a fin 26) of a heat spreader/plate 28.

The heat spreader 28 includes a contact portion 30 in thermal communication with a portion of the battery cell(s) 12. The contact portion 30 can include the heat spreader 28 being in thermal communication with a temperature sensitive region of the electrical device (e.g., battery cell(s) 12). The temperature sensitive region of the electrical device can be, for example, a hotspot when the electrical device is operating. For example, when a battery 14 is charging or discharging, the battery cell(s) 12 may have hotspots (e.g., one or more regions that have a higher temperature relative to other regions of the battery cell(s) 12). Accordingly, the contact portion 30 of the heat spreader 28 may include at least being over and in thermal communication with the hotspot to thermally manage the battery cell(s) 12 as discussed herein.

The fin 26 can extend in the same direction, perpendicular to, or at various other angles relative to the cell contact portion 30. In some embodiments, the second side 24 of the TED 20 is coupled or configured to be coupled to a heat source and/or heat sink system 32 or thermal energy transfer system (e.g., for providing heat to the TE device 20 or for dissipation or removal of heat from the TE device 20).

Figure 23:
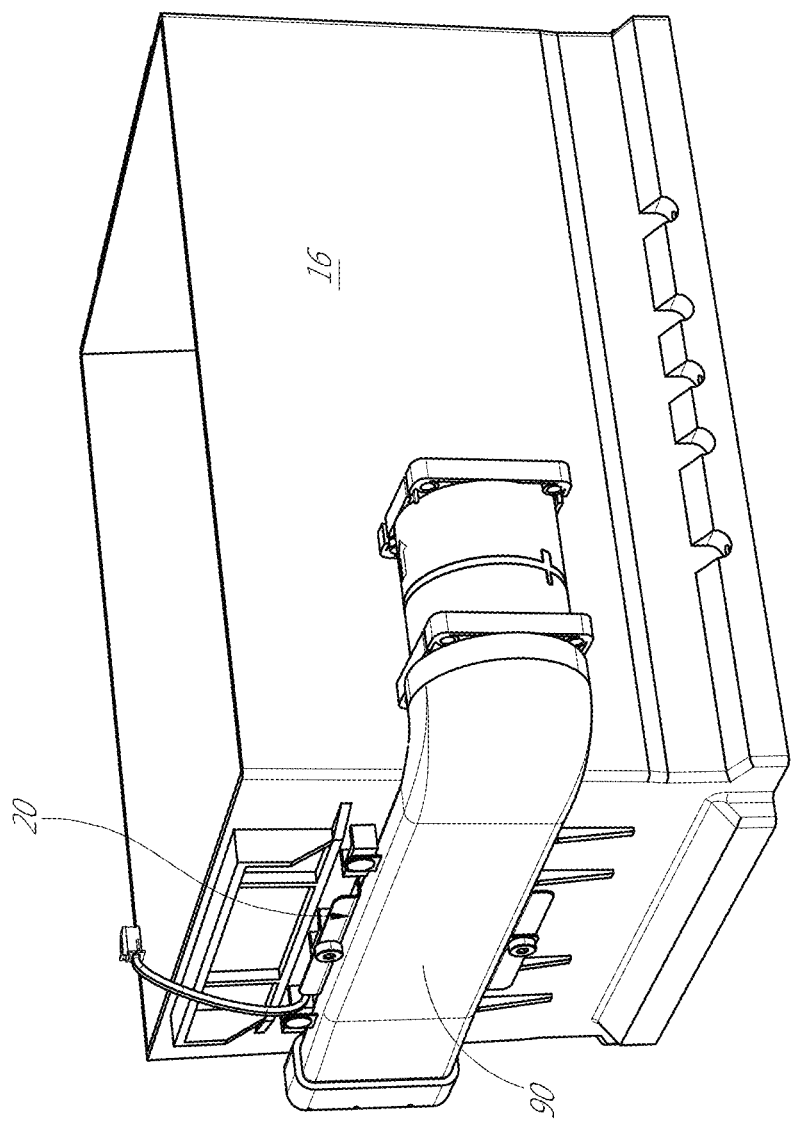
FIG. 23 illustrates an embodiment of an air duct and blower system or assembly.
Figure 24:
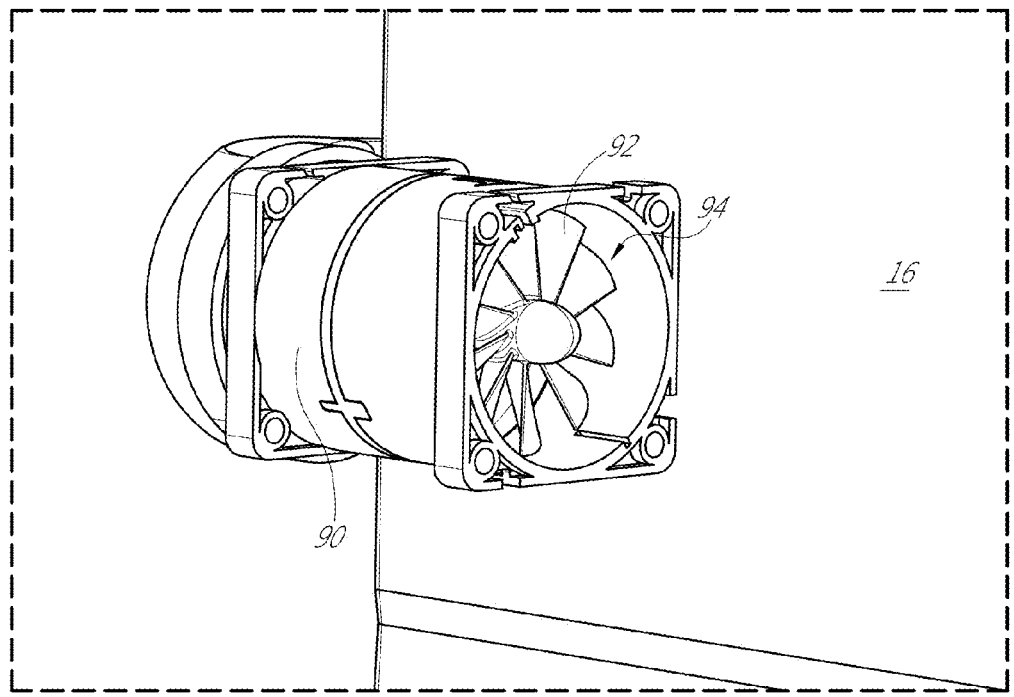
FIG. 24 illustrates an embodiment of an air duct and blower system or assembly.
Figure 25:
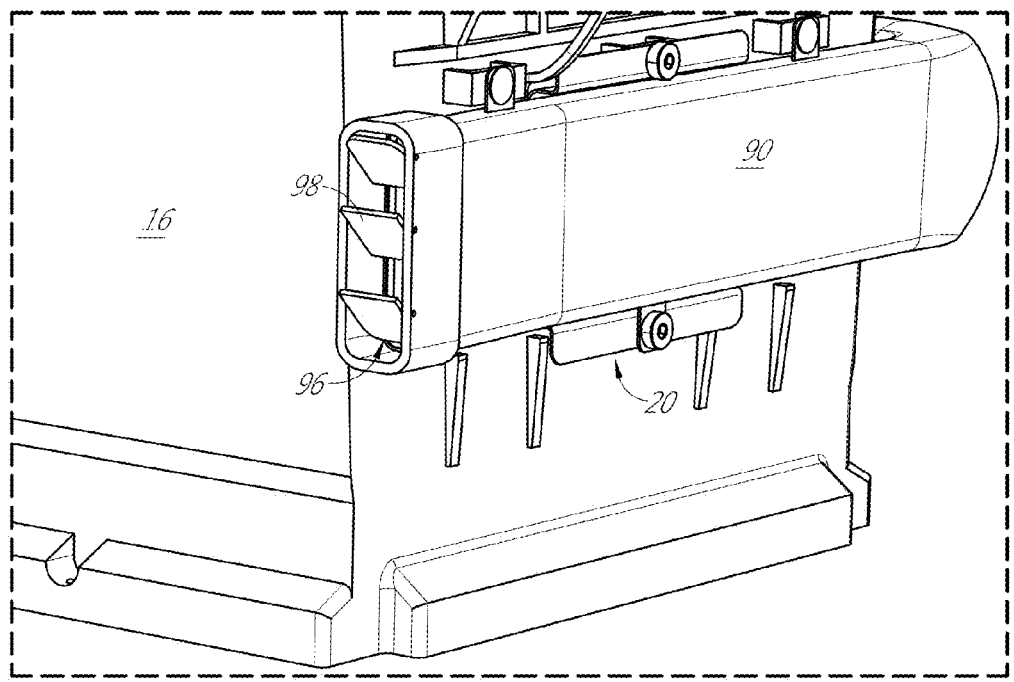
FIG. 25 illustrates an embodiment of an air duct and blower system or assembly.

In some embodiments, the battery case 16, second side 24 (e.g., waste surface) of the TED 20, heat source and/or heat sink system 32, and/or battery cell(s) 12 are exposed to the ambient air such that heat can be dissipated or removed accordingly to the environment (e.g., an air duct 90 and blower 92 system, as discussed herein, and in particular in reference to FIGS. 23-25). In some embodiments, the battery case 16 is sealed and TED 20 is positioned within the battery case 16 such that the TED 20 is in thermal communication with the battery case 16 that can function as the heat sink or heat source).

In some embodiments, a thermoelectric (TE) thermal management system 34 is provided comprising one or more TEDs 20 in thermal communication with components of the electrical device and/or heat spreaders 28. The TE thermal management system 34 controls the TED 20 to heat or cool the battery cells 12 as discussed herein. A controller of the TE thermal management system 34 may be separate or integrated with a controller 36 as discussed herein.

In some embodiments, the BTMS 10 includes a power source 38 for providing electrical current to the heat spreaders 28 and/or TED 20 and/or as discussed herein. In other embodiments, the heat spreaders 28 and/or TEDs are powered in-line with the battery 14. In some embodiments, the BTMS 10 includes a controller 36 and/or printed circuit board or substrate 79 (see for example FIG. 18) in electrical communication with the various components of the BTMS 10, including the battery cell 12, battery 14, battery case 16, heat spreader 28, TED 20, heat source and/or heat sink system 32, TE thermal management system 34, power source 38, and/or sensor 40. The controller 36 can be integrated onto a printed circuit board 79 (see for example FIG. 18) having one or more controllers as discussed herein. The controller 36 can include a thermal management controller that can operate in a heating mode or cooling mode to heat or cool, respectively, an electrical device (e.g., battery cell(s) 12). The printed circuit board 79 can be positioned within the battery case 16 and can include a power connection for supplying electric power to the TE thermal management system 34 or other systems discussed herein requiring electrical power.

In some embodiments, the BTMS 10 includes one or more sensors 40 (e.g., electrical, temperature) for providing electrical and/or temperature information of the battery cells 12, TED 20, ambient temperature, and/or temperature within the battery case 16 to the controller 36 such that the electrical power (e.g., current, voltage) to the TED 20 can be adjusted accordingly to provide the appropriate level of heating or cooling as desired or required to maintain the temperature of the battery at an optimum level.

As discussed herein, thermally managing battery cells can include using one or more thermoelectric devices (TEDs) or modules. In some embodiments, one or more TEDs may be used to cool or heat one or more battery cases, battery cells, heat spreaders, cold plates, heat/hot plates, and/or fins in contact with the battery cells, air circulating within, about, and/or blown through the battery case, electrodes of the batteries, battery terminals, and/or other components. As discussed herein, thermally managing battery cells can include using one or more heat spreaders to heat or cool (with or without TEDs) one or more battery cases, battery cells, air circulating within, about, and/or blown through the battery case, electrodes of the batteries, battery terminals, and/or other components.

Generally, in order to use TEDs efficiently, thermal losses (e.g., thermal resistance) should be reduced along the thermal path from the heat source to the TED. Therefore, the location (e.g., position, alignment) of the one or more TEDs needs to be optimized based on the specifics of the electrical device (e.g., battery cell construction) and localization of heat production.

As discussed herein, for thermal management of start-stop batteries it can be advantageous to use a TE thermal management system. However, typically a TE thermal management system sized for sufficient cooling of the battery would not provide enough thermal capacity for a high power heating requirement. Resistive heating elements may be much more suitable for a high power heating application. For many reasons including cost, performance, and efficiency, in some embodiments, it can be beneficial to combine the TE thermal management system (e.g., cooling and/or heating system) with a high power heating system (e.g., resistive, Joule heating). However, in some embodiments, a high power heating system is provided for thermal management of an electrical device without or not in combination with a TE thermal management system.

In some embodiments, Pyrolytic graphite (carbon) is provided as the medium or interface material for combining the two thermal management solutions. Pyrolytic graphite is both electrically resistive and highly thermally conductive. The resistive property makes it useful as a thin resistive heating element that can be placed between battery cells for high power heating applications or systems. The thermally conductive property is useful for transferring heat to and from battery cells and/or to and from a thermoelectric cooling module.

Pyrolytic graphite has many unique properties. One such property is its in-plane (e.g., plane 63 as discussed herein, see for example FIG. 12) thermal conductivity which can be up to 1700 W/m*K. As a comparison, copper and aluminum have thermal conductivities of about 400 W/m*K and 205 W/m*k, respectively. The higher the thermal conductivity of a material, the lower the temperature gradient will be through the material. This can be beneficial to certain thermoelectric temperature management systems because the efficiency of these devices is improved greatly by reducing the temperature difference between the item or device to be thermally managed and the ambient thermal reservoir temperature.

Figure 2:
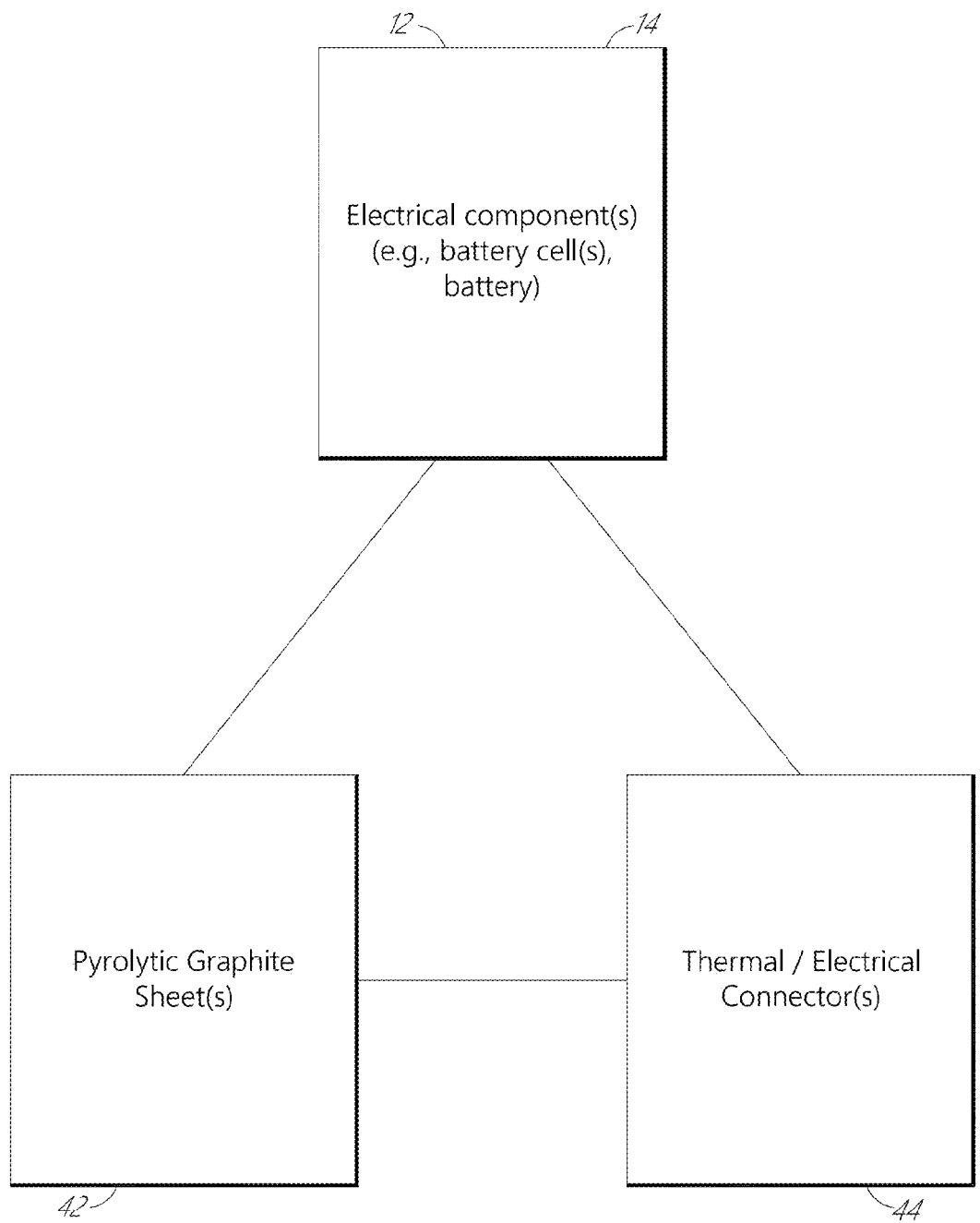
FIG. 2 is a schematic illustration of an embodiment of some components of an electrical device thermal management system.

FIG. 2 is a schematic illustration of an embodiment of some components of an electrical device thermal management system. As illustrated in FIG. 2, Pyrolytic graphite sheets, layers, or surfaces 42 forming at least a part of a heat spreader 28 as discussed herein can be connected, attached, or coupled to the electrical component(s) (e.g., battery cell(s) 12, battery 14) such that they are in thermal and/or electrical communication in any suitable manner (e.g., adhesive, directly, indirectly via interstitial materials (grease) or other interfaces, press-fit, screws, nuts, bolts, nails). In some embodiments, tight contact pressure is maintained in any suitable manner between surfaces of the graphite sheet 42 and the electrical component(s) (e.g., battery cell(s) 12, battery 14) to maintain contact (e.g., direct thermal and/or electrical communication). In some embodiments, surfaces of the electrical component(s) (e.g., battery cell(s) 12, battery 14) conform to the surfaces of the graphite sheet 42 and/or vice versa via such contact pressure or attachment.

As illustrated in FIG. 2, one or more thermal/electrical connectors or elevators 44 forming at least a part of a heat spreader 28 as discussed herein can be connected, attached, or coupled to the electrical component(s) (e.g., battery cell(s) 12, battery 14) such that they are in thermal and/or electrical communication in any suitable manner (e.g., adhesive, directly, indirectly via interstitial materials (grease) or other interfaces, press-fit, screws, nuts, bolts, nails). The thermal/electrical connector 44 can be connected, attached, or coupled to the graphite sheet 42 such that they are in thermal and/or electrical communication in any suitable manner (e.g., over molded, adhesive, directly, indirectly via interstitial materials (grease) or other interfaces, press-fit, screws, nuts, bolts, nails). In some embodiments, surfaces of the electrical component(s) (e.g., battery cell(s) 12, battery 14) conform to the surfaces of the thermal/electrical connector 44 and/or vice versa via such contact pressure or attachment. In some embodiments, surfaces of the graphite sheet 42 conform to the surfaces of the thermal/electrical connector 44 and/or vice versa via such contact pressure or attachment. Accordingly, as illustrated in FIG. 2, the electrical component(s) (e.g., battery cell(s) 12, battery 14), graphite sheet 42, and thermal/electrical connector 44 can be can be connected, attached, or coupled to each other such that they are in thermal and/or electrical communication with each other.

Figure 3:
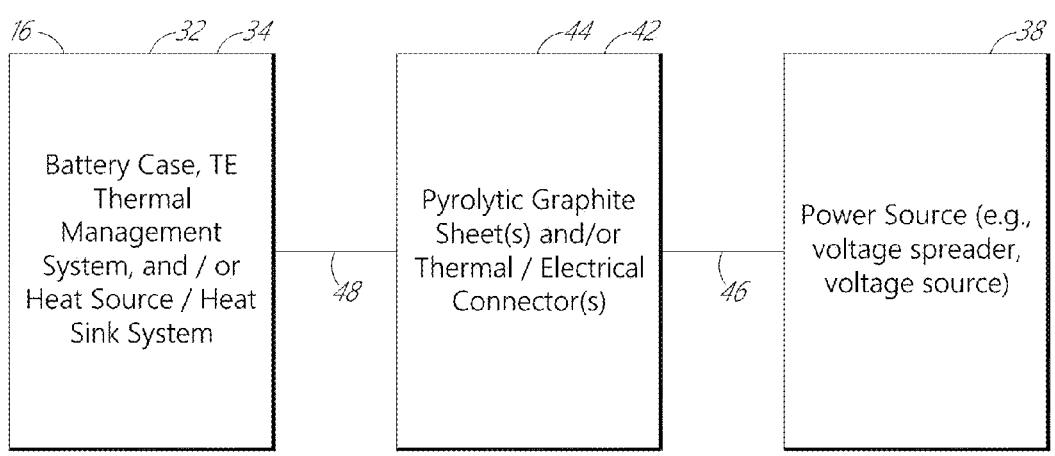
FIG. 3 is a schematic illustration of an embodiment of some components of an electrical device thermal management system.

FIG. 3 is a schematic illustration of an embodiment of some components of an electrical device thermal management system. As illustrated in FIG. 3, an electrical connection 46 is coupled to a graphite sheet 42 to provide resistive heating to the graphite sheet 42 via a power source 38. In some embodiments, the electrical connection or junction 46 is coupled to the battery cell(s) 12 to provide the power source. The electrical connection 46 can be coupled to the graphite sheet 42 in any suitable manner (e.g., mechanical coupling, adhesive).

As illustrated in FIG. 3, a mechanical, thermal and/or electrical connection 48 (e.g., conductor) connects the graphite sheet 42 and/or thermal/electrical connector 44 to the battery case 16, TED 20, and/or heat source/heat sink system 32. The connection 48 can connect, attach, or couple the graphite sheet 42 and/or thermal/electrical connector 44 to the TED 20 to physically fix the TE thermal management system 34 (e.g., TED 20) relative to the graphite sheet 42 and/or thermal/electrical connector 44 as well as provide thermal communication between the respective components in any suitable manner (e.g., adhesive, directly, indirectly via interstitial materials (grease) or other interfaces, press-fit, screws, nuts, bolts, nails). The connection 48 can connect, attach, or couple the graphite sheet 42 and/or thermal/electrical connector 44 to the battery case 16 to physically fix the graphite sheet 42 and/or thermal/electrical connector 44 relative to the battery case 16 as well as provide thermal and/or electrical communication between the respective components in any suitable manner (e.g., adhesive, directly, indirectly via interstitial materials (grease) or other interfaces, press-fit, screws, nuts, bolts, nails). The connection 48 can connect, attach, or couple the graphite sheet 42 and/or thermal/electrical connector 44 to the heat source and/or heat sink system 32 to physically fix the graphite sheet 42 and/or thermal/electrical connector 44 relative to the heat source and/or heat sink system 32 as well as provide thermal and/or electrical communication between the respective components in any suitable manner (e.g., adhesive, directly, indirectly via interstitial materials (grease) or other interfaces, press-fit, screws, nuts, bolts, nails).

Figure 4:
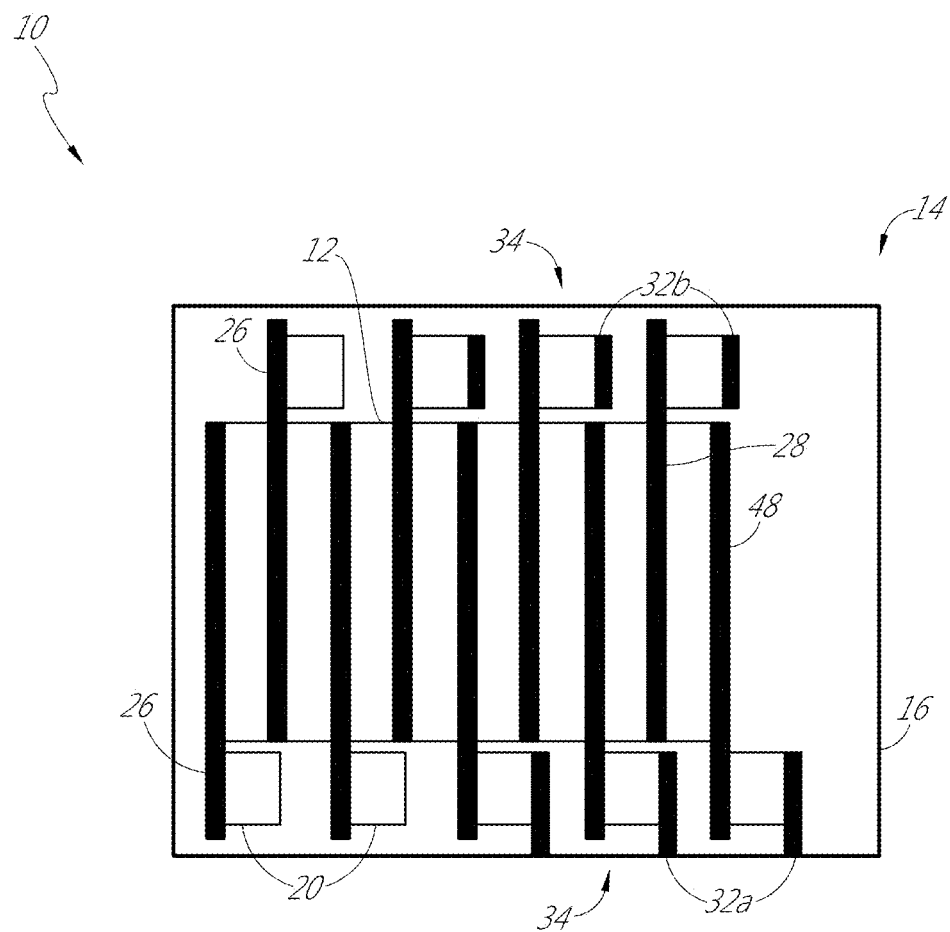
FIG. 4 illustrates an embodiment of an electrical device thermal management system for a battery.

FIG. 4 illustrates an embodiment of an electrical device thermal management system for a battery 14. In some embodiments, as illustrated in FIG. 4, a battery 14 having a BTMS 10 can have battery cells 12 stacked against each other (e.g., facing each other on certain surfaces of the battery cells 12). Heat spreaders 28 can be positioned between the battery cells 12. The heat spreaders 28 can be in thermal communication with the battery cells via contact portion(s) 30 in thermal communication with the battery cells 12 in any suitable manner as discussed herein.

As illustrated in FIG. 4, the heat spreaders 28 can have a fin 26 that projects beyond a periphery or boundary of the battery cells 12 into or toward the battery case 16. The fin 26 can be an extension of the heat spreader 28 composed of substantially the same material as the heat spreader 28. In some embodiments, the fin 26 can be attached to the heat spreader and made of different material from the heat spreader 28 (e.g., a heat spreader 28 can be graphite while the fin 26 may be metallic).

A TED 20 of a TE thermal management system 34 may be positioned on the fin 26 to be in thermal communication with the heat spreader 28 via the fin 26. The TED 20 can be in thermal communication with the fin 26 in any suitable manner as discussed herein (e.g., via a direct thermal communication or via an interstitial material). In some embodiments, the fin 26 can be a feature of the heat spreader 28 that tapers or reduces to a smaller surface area and/or volume to concentrate thermal energy transfer to a connection 48 and/or TED 20. In some embodiments, the fin 26 is an extension of the heat spreader 28 beyond a perimeter of, for example, a battery cell 12 with similar dimensions as the heat spreader 28 portions in thermal communication with the battery cell 12.

The main side or surface 22 of the TED 20 can be in thermal communication with the fin 26. The waste side or surface 24 of the TED 20 can be in thermal communication with a heat source and/or heat sink 32. As illustrated in FIG. 4, a heat source and/or heat sink system 32a may be in thermal communication (e.g., direct/substantial thermal communication) with the battery case 16. In some embodiments, the battery case 16 may function as the heat source and/or heat sink. As also illustrated and FIG. 4, the heat source and/or heat sink system 32b may not be in direct thermal communication with the battery case 16, the heat source and/or heat sink system may provide or remove thermal energy via any suitable means such as thermal energy transfer via a working fluid to a heat source (e.g., an engine coolant circuit) and/or a heat sink (e.g., a radiator) within or outside the battery 14.

Embodiments of Heat Spreaders

Figure 5:
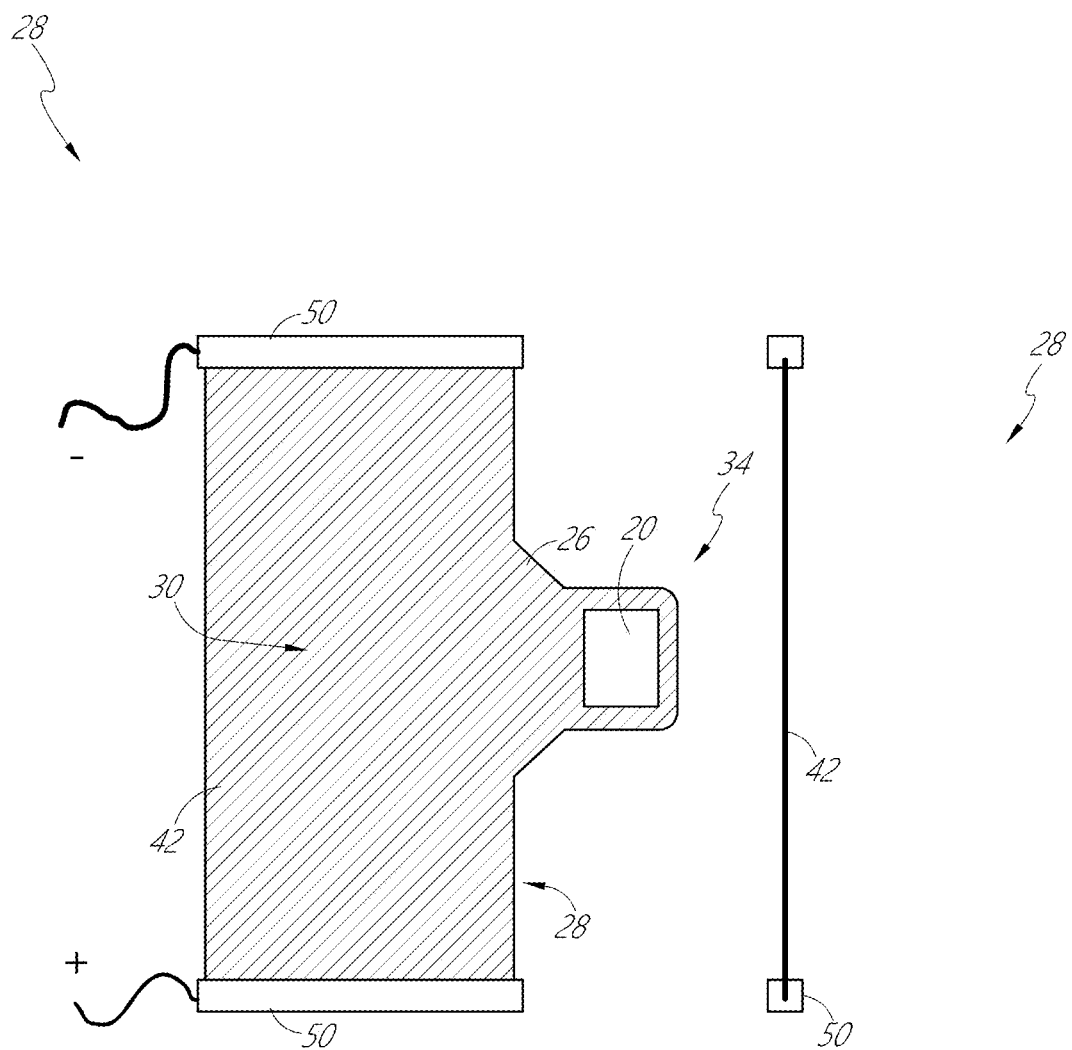
FIG. 5 illustrates side and front views of an embodiment of a heat spreader.

FIG. 5 illustrates side and front views of an embodiment of a heat spreader 28. As discussed herein, a combined pyrolytic graphite resistive heater and heat sink 28 (or heat spreader) is provided comprising one or more pyrolytic graphite sheets, layers, or surfaces 42 positioned between electrical components (e.g., battery cells 12) of the electrical device (e.g., battery 14) as discussed herein. The heat spreader 28 can have a voltage spreader 50 (e.g., conductor) or other power source to supply electrical power (e.g., current, voltage) to the Pyrolytic graphite sheets 42. When electrical power is supplied to the pyrolytic graphite sheets 42, the heat spreader 28 can function as a resistive heater. For example, as electrical current passes through the graphite sheets 42 from a positive end to a negative end of the voltage spreader 50, the electrical current heats up the graphite sheets 42 due to the electrical resistance of the graphite sheets 42. In some embodiments, the voltage spreader 50 can include or be composed of thermal/electrical connectors 44 as discussed herein.

As illustrated in FIG. 5, a TE thermal management system 34 is provided comprising one or more TEDs 20 in thermal communication with components of the electrical device and/or pyrolytic graphite sheets 42. The TEDs 20 can be positioned on and in thermal communication with the heat spreader 28 via a fin 26 as discussed herein. In some embodiments, a combined pyrolytic graphite resistive heater and heat sink is provided without a TE thermal management system 34 (e.g., a TED 20). In some embodiments, a resistive heater is provided with a voltage spreader 50 to provide electrical power to the graphite sheets 42 without a TE thermal management system 34 and/or TED 20.

Figure 6:
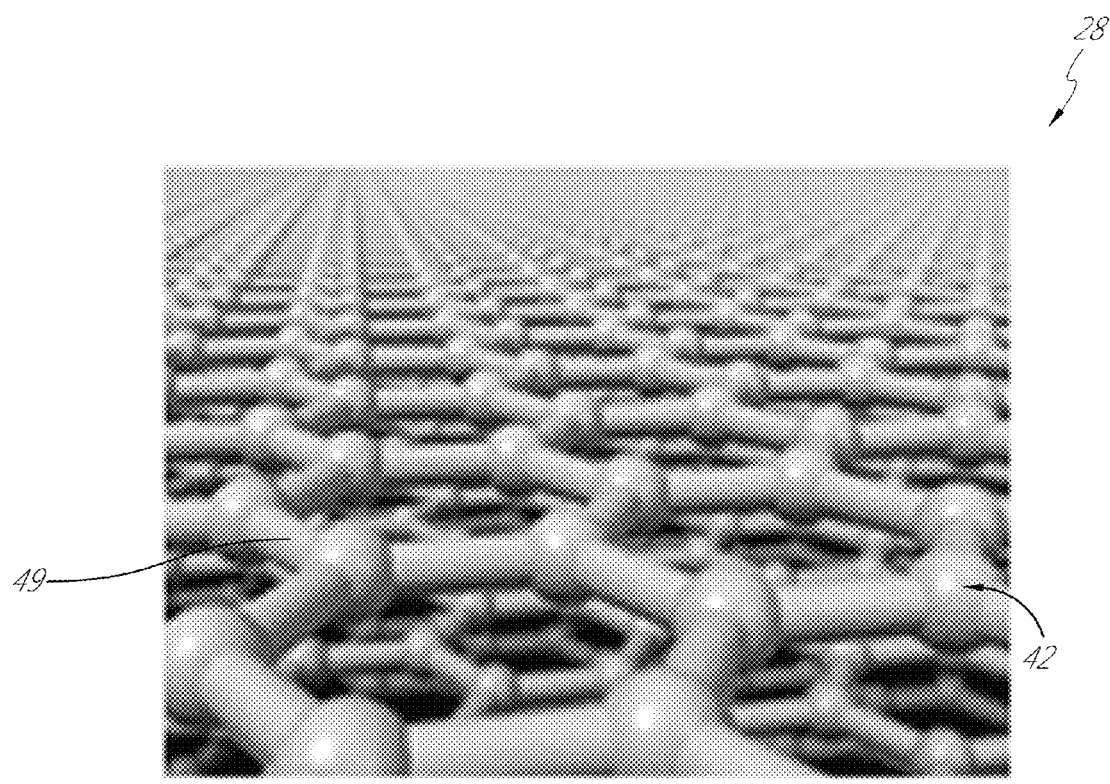
FIG. 6 illustrates an embodiment of graphite sheets of a heat spreader.
Figure 7:
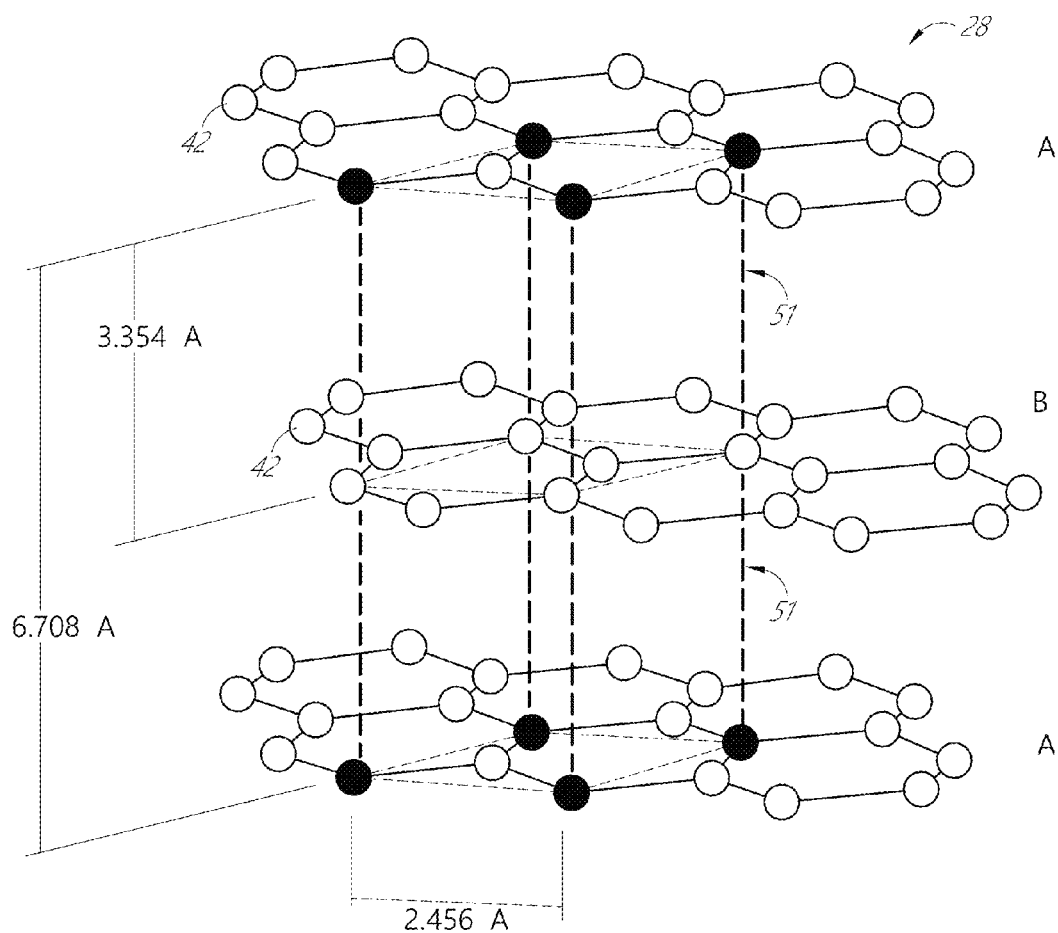
FIG. 7 illustrates an embodiment of graphite sheets of a heat spreader.

FIGS. 6 and 7 illustrate an embodiment of graphite sheets 42 of a heat spreader 28. As illustrated in FIGS. 6 and 7, the layered structure of pyrolytic graphite (e.g., sheets 42 as discussed herein) is responsible for its anisotropic thermal conductivity. Covalent bonds 49 within layers of carbon atoms are responsible for high thermal conductivity within the plane and relatively weak bonds 51 between layers of carbon atoms reduces thermal and electrical conductivity normal to the plane. For a combined heating and cooling solution the heat transfer orthogonal to the planes is generally less important due to distances of which heat is to be transferred. For example, orthogonal to the plane, the thickness of the graphite portion (e.g., sheet, surface) may be as small as 25 μm but within plane, heat transfer may take place over hundreds of millimeters.

Figure 8:
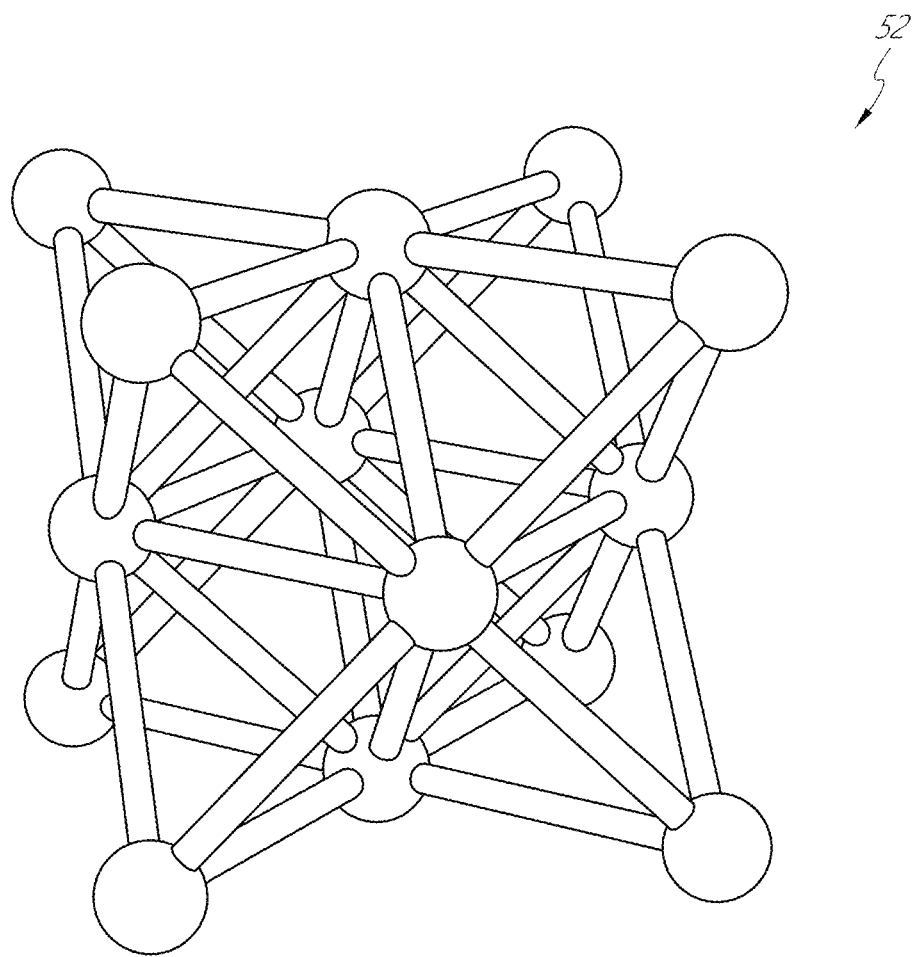
FIG. 8 illustrates an embodiment of an isotropic structure of a metal.

Although heat and electrical transfer orthogonal to the plane is generally less of a concern, this transfer can be improved by using thermal/electrical "elevators" or "conveyer belts" (e.g., thermal/electrical connectors 44) to deliver heat or electrons to the various layers of graphite (e.g., forming a graphite metal composite). In contrast to the anisotropic properties of the graphite, metals have isotropic thermal and electrical properties. For example, the isotropic structure of a metal, such as copper 52, is illustrated in FIG. 8. Certain metals (e.g., copper, aluminum) therefore make good "elevators" to transfer heat and electrons between graphite layers as illustrated in FIG. 9.

Figure 9:
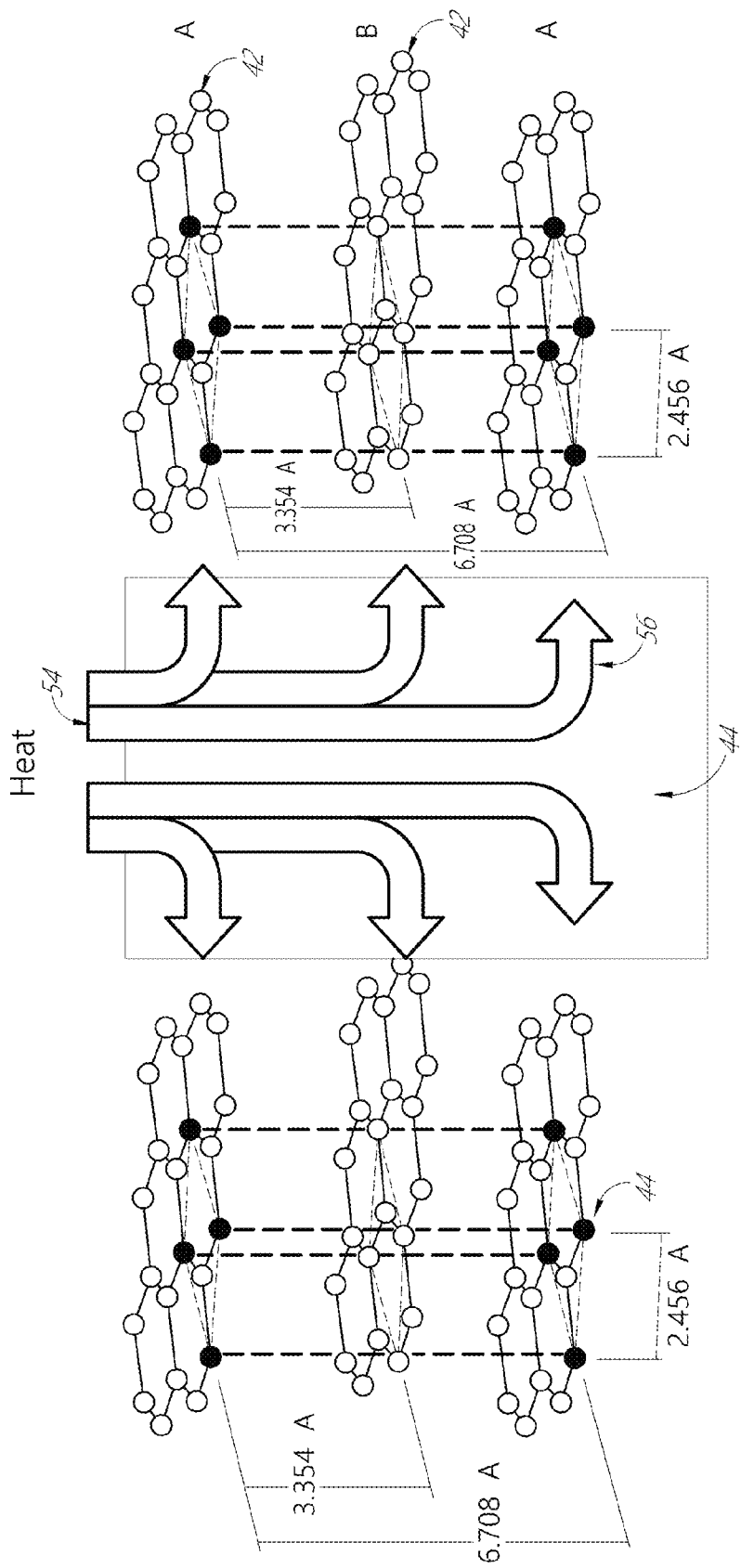
FIG. 9 illustrates an embodiment of graphite sheets of a heat spreader with thermal/electrical connectors.

FIG. 9 illustrates an embodiment of graphite sheets 42 of a heat spreader 28 with thermal/electrical connectors 44. The thermal/electrical connectors 44 can be formed within various layers of graphite sheets 42. The thermal/electrical connectors 44 can transfer heat or electrons to the different layers of graphite sheets 42 in an orthogonal or normal direction 54 relative to the graphite sheets 42 (e.g., orthogonal to a plane 63 extending substantially along or in parallel to the graphite sheets 42, see for example FIG. 12). The thermal/electrical connectors 44 can thereafter transfer heat or electrons into the different layers of graphite sheets 42 in a parallel direction 56 into the graphite sheets 42 (e.g., along a plane 63 extending substantially in parallel to the graphite sheets 42). Accordingly, the thermal/electrical connectors 44 provide thermal and electrical communication between the layers of graphite sheets 42 that otherwise would be substantially inhibited or mitigated.

The surfaces of the thermal/electrical connectors 44 may also improve the thermal contact resistance (e.g., decrease thermal contact resistivity and/or increase thermal contact conductivity) between the graphite sheets 42 and the electrical components (e.g., battery cells 12) or between the graphite sheets 42 and the TED 20 over just using graphite alone for the thermal interface. This may be due to potentially better surface characteristics of the thermal/electrical connectors 44 contact surface that can further improve the performance of the BTMS 10.

Figure 10:
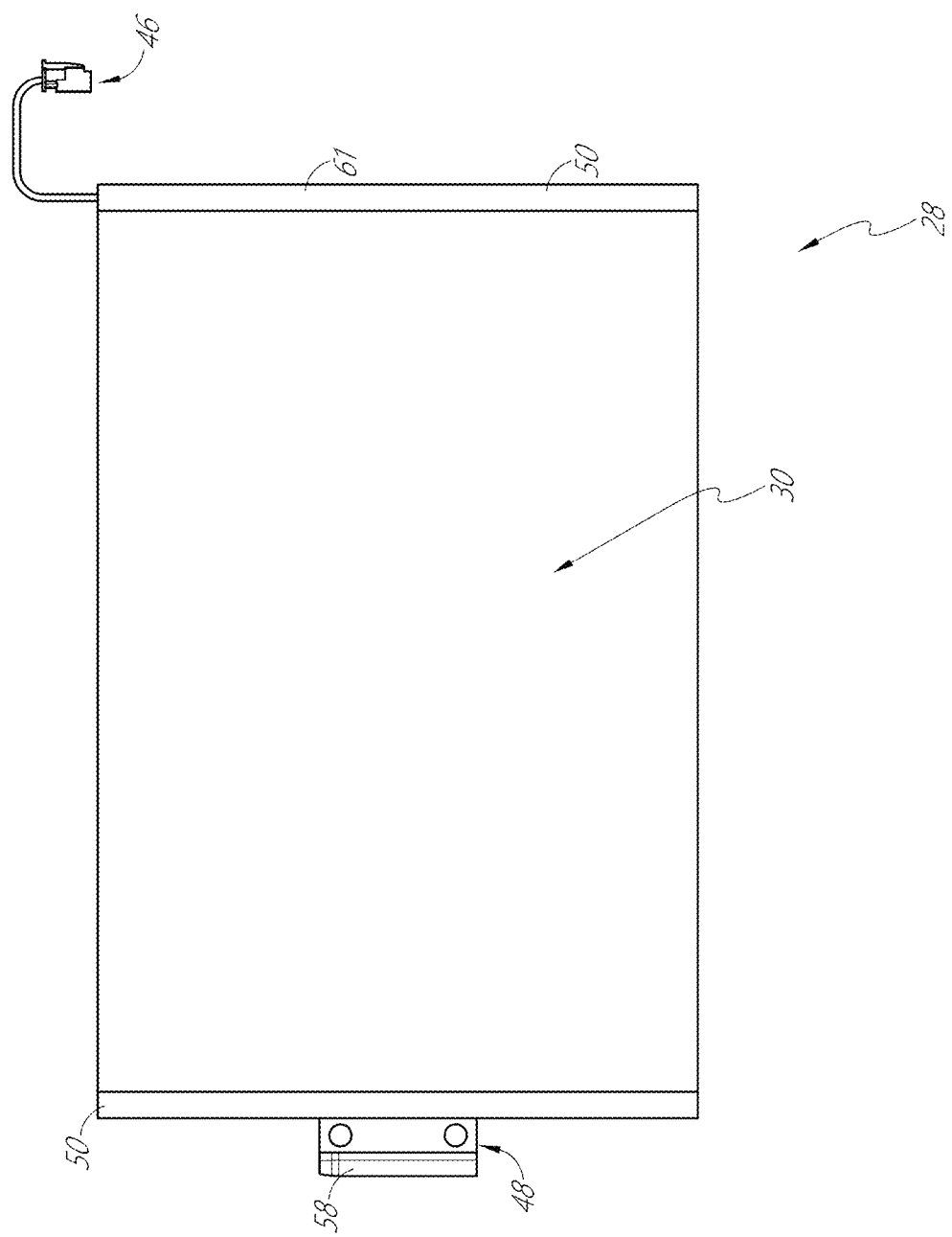
FIG. 10 illustrates an embodiment of a heat spreader.
Figure 11:
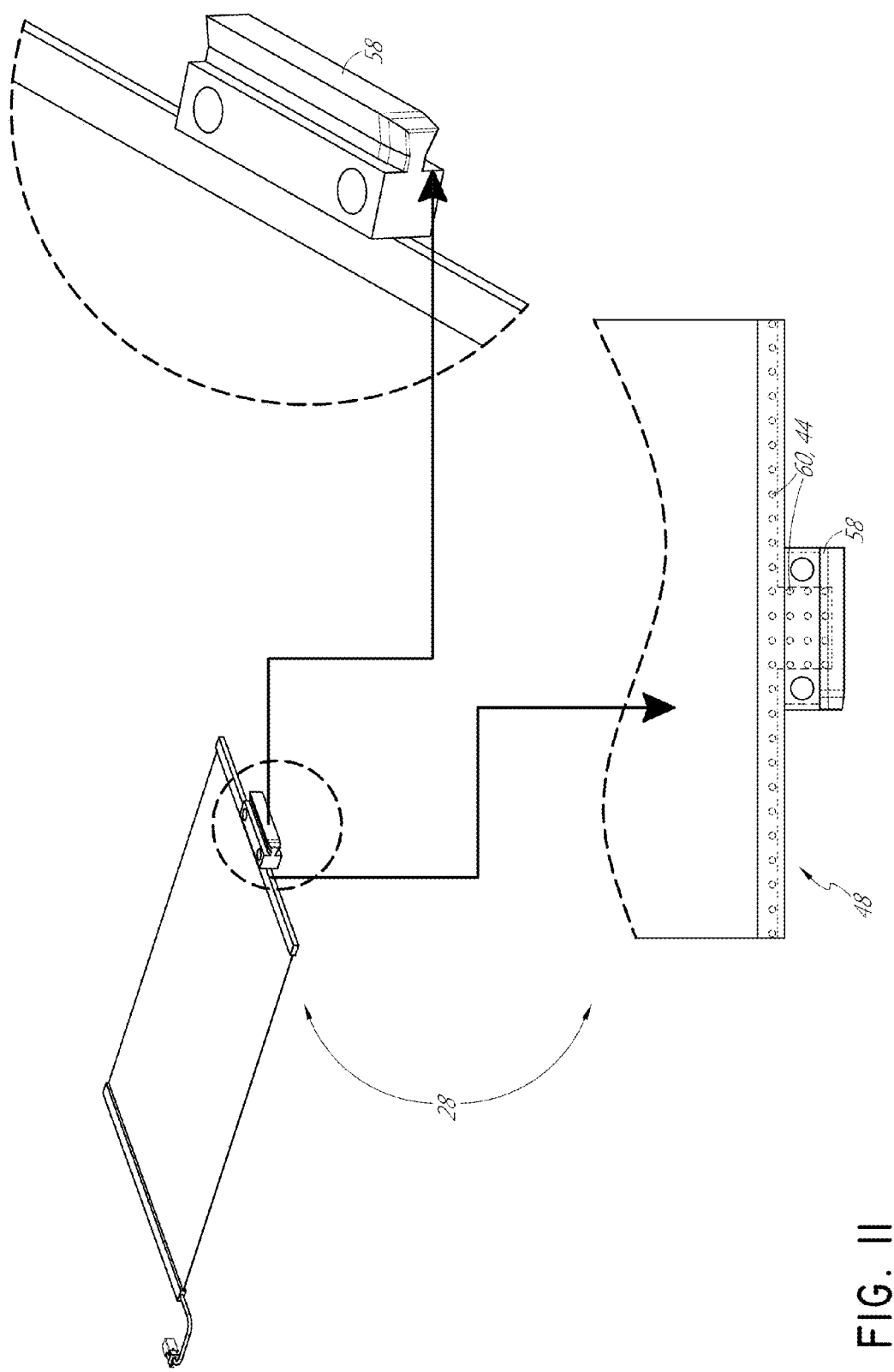
FIG. 11 illustrates an embodiment of a heat spreader.
Figure 12:
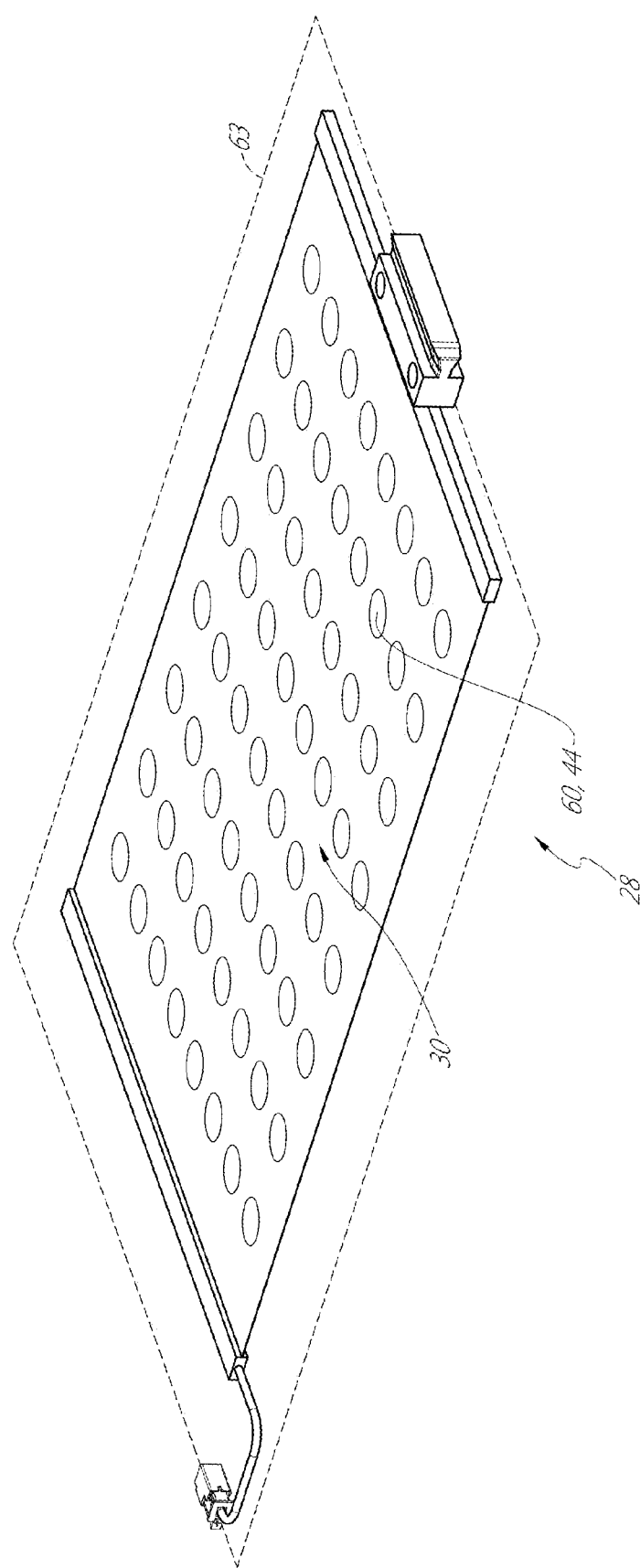
FIG. 12 illustrates an embodiment of a heat spreader.

In some embodiments, the materials used as thermal/electrical connectors 44 is injected (e.g., injection aluminum molding) or press fit into spaces, apertures or holes formed in the graphite sheets or surfaces 42. In some embodiments, the surface of the graphite sheets 42 is doped with such metals. In some embodiments, the surface of the graphite sheets 42 is cast with certain metals (e.g., having a disk-shaped or other shapes). In some embodiments, the graphite sheet 42 is over-molded with the thermal/electrical connectors or elevators 44 or vice versa as illustrated in FIGS. 10-12. The elevators 44 can be of any suitable shape or size and can be coupled or integrated into the graphite surface 42 in any suitable manner.

FIGS. 10-12 illustrate an embodiment of a heat spreader 28. In some embodiments, an electrical connection 46 is coupled to the heat spreader 28 as discussed herein to provide resistive heating to or of the graphite sheets 42 via a voltage spreader 50 or other power source. The electrical connection 46 can be coupled to the graphite sheet 42 and/or voltage spreader 50 in any suitable manner (e.g., mechanical coupling, adhesive) as discussed herein. Further, the voltage spreader 50 can be coupled to the graphite sheet 42 in any suitable manner as discussed herein.

Figure 19:
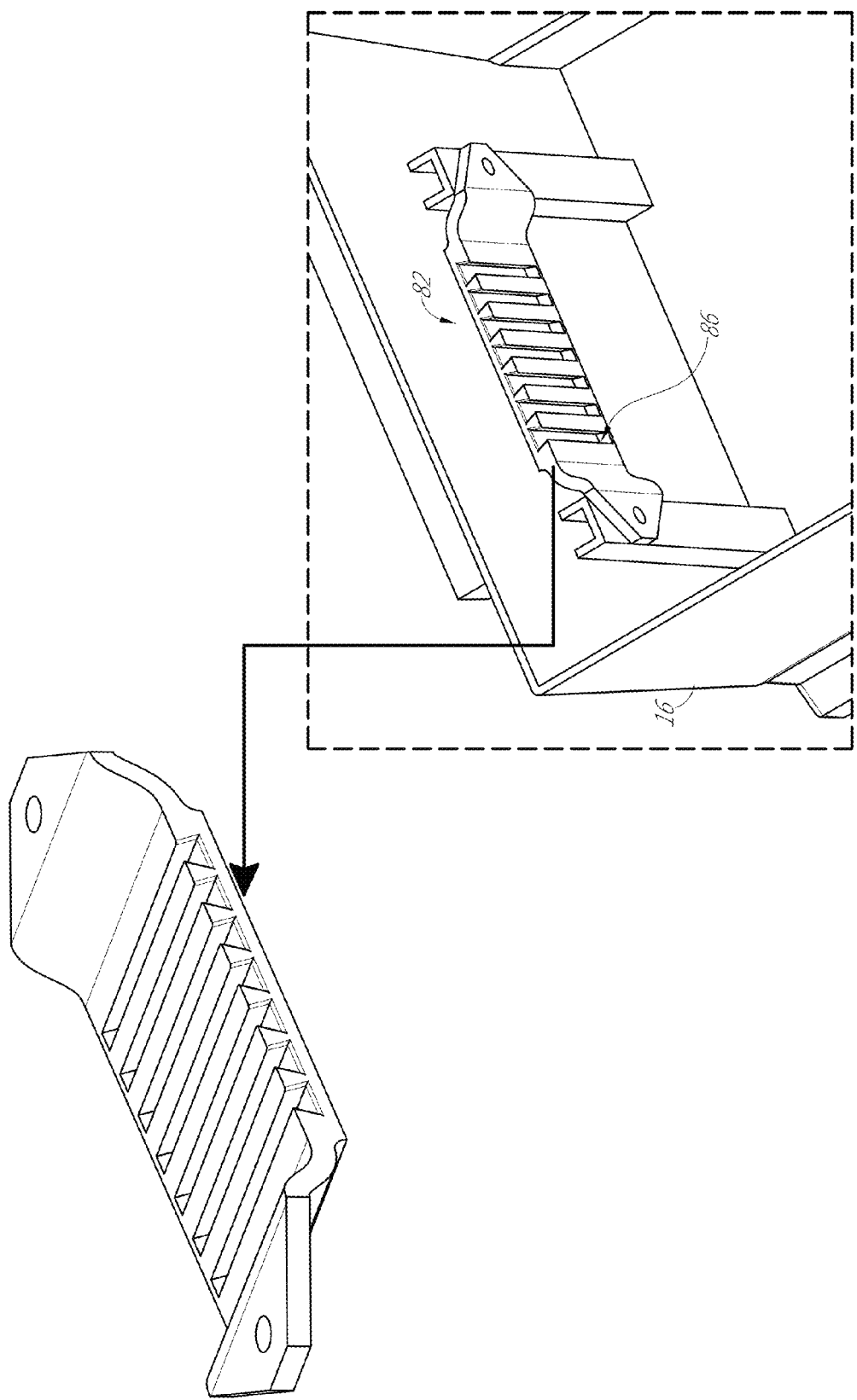
FIG. 19 illustrates an embodiment of a battery case with a thermal interface and a thermal window.
Figure 20:
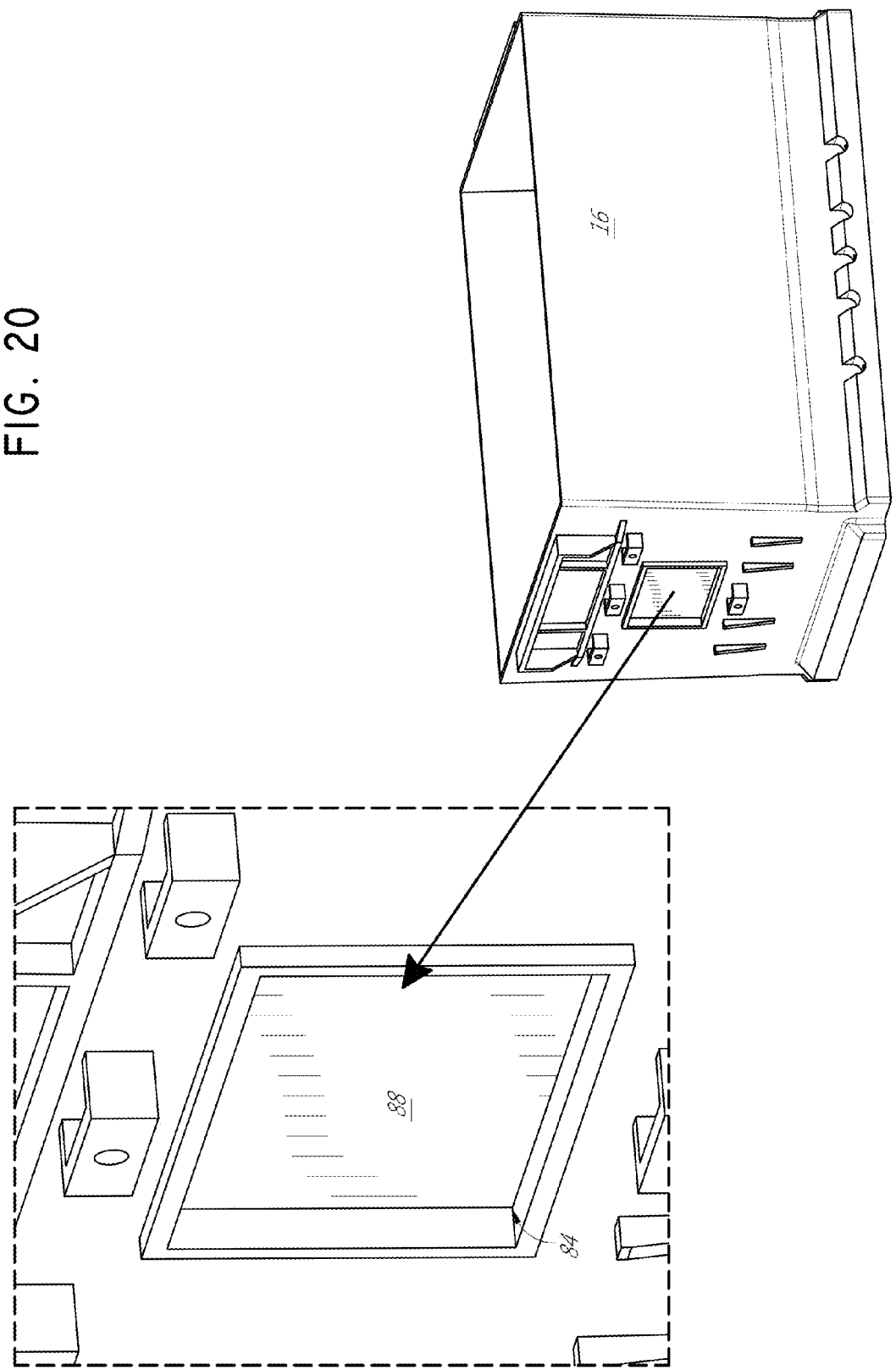
FIG. 20 illustrates an embodiment of a battery case with a thermal interface and a thermal window.
Figure 21:
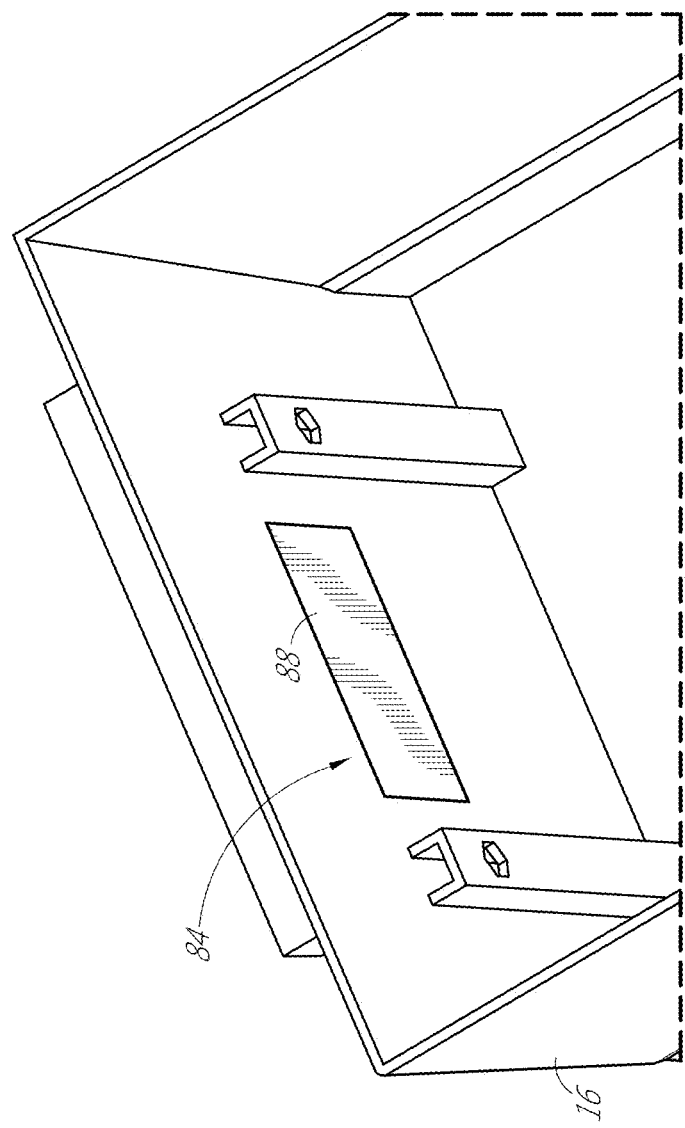
FIG. 21 illustrates an embodiment of a battery case with a thermal interface and a thermal window.

In some embodiments, a mechanical, thermal, and/or electrical connection 48 is over molded over a portion of the graphite sheet 42. The connection 48 can be a multi-function connection as discussed herein and composed of, for example, metal as discussed herein. In some embodiments, the connection 48 can have a tapered dovetailed shape 58. The dovetail 58 can be shaped to connect, couple, mate, and/or attach to a corresponding component of the battery case 16 (e.g., thermal interface 82 as discussed herein, and in particular in reference to FIGS. 19-21).

As illustrated in FIGS. 10-12, the dovetail 58 can be a male component (e.g., first mechanical connector). The battery case 16 can have a corresponding female component (e.g., second mechanical connector) to engage or accept the dovetail shape 58 in any suitable manner as discussed herein (e.g., interference fit as well as thermal grease). The connection 48 can physically secure or fix the heat spreader 28 relative to the battery case 16. The dovetail 58 can provide at least a part of the mechanical, thermal, and/or electrical functionality to the connection 48 as discussed herein.

As illustrated in FIGS. 11 and 12, the heat spreader 28 can have holes or openings 60. The openings 60 can extend through two or more layers of graphite sheets 42 (e.g. orthogonal to the graphite sheets or plain extending along or parallel to the graphite sheets 42). As illustrated in FIG. 11, the openings 60 can be near or at the periphery, boundary, or edge of the heat spreader 28. The connection 48 can be over molded onto the openings 60 to provide the elevators 44 between the graphite sheets 42 as discussed herein. Accordingly, the connection 48 can include the elevators 44 at the boundaries, sides, or edges of the heat spreader 28. As illustrated in FIG. 12, the openings 60 can be included throughout an extent or surface area of the heat spreader 28, including the contact portion 30. The thermal elevators 44 can be provided or over molded as discussed herein in the openings 60. Accordingly, the openings 60 can be locations of thermal elevators 44 as desired throughout the heat spreader 28.

Accordingly, the connection 48, including the dovetail 58, can be over molded over a portion of the heat spreader 28 to create thermal/electrical elevators 44 in the heat spreader 28. In some embodiments, the graphite sheets 42 are die-cut in irregular shapes to increase contact area of the connection 48 between the graphite sheets and, for example, the elevators 44 and/or voltage spreader 50.

As illustrated in FIGS. 11 and 12, the over molded components (e.g. including connection 48) can be provided on multiple edges or sides of the heat spreader 28. For example, as illustrated in FIG. 11, the over molded components can be provided on opposite sides of the heat spreader 28.

With continued reference to FIG. 11, a component 61 (e.g., conductor) that is, for example, over molded as discussed herein connection 43 can be provided on an opposite side of the connection 48. The component 61 can have thermal elevators 44 as discussed herein. While the component 61 in some embodiments is not connected to, for example, the battery case 16, the component 61 can provide the functionality of elevators 44 as discussed herein as well as further structural integrity to the heat spreader 28. For example, the component 61 (as well as the over molded connection 48 on the opposite side of the heat spreader), can provide structural rigidity and strength to the graphite sheets 42.

As illustrated in FIG. 11, the over molded components (including connection 48 and component 61) can extend substantially an entirety of a dimension (e.g., width, length) of the heat spreader 28 to provide structural integrity to the heat spreader 28 at least in part due to the over molded components being made of a more rigid material such as metal. In some embodiments, the over molded components may extend less than (e.g., half or three-quarters) of a dimension of the heat spreader 28 while providing structural integrity to the heat spreader 28.

As illustrated in FIG. 12, the openings 60 can be positioned throughout the heat spreader 28. For example, the openings 60 can be provided in the heat spreader 28 in any desired pattern in any desired quantity extending along the plane 63 substantially parallel to the graphite sheets 42. The elevators 44 can be over molded onto and/or into the heat spreader 28 to provide the functionality of the elevators 44 as discussed herein throughout the plane 63 along the graphite sheets 42, including contact portion(s) 30.

Figure 13:
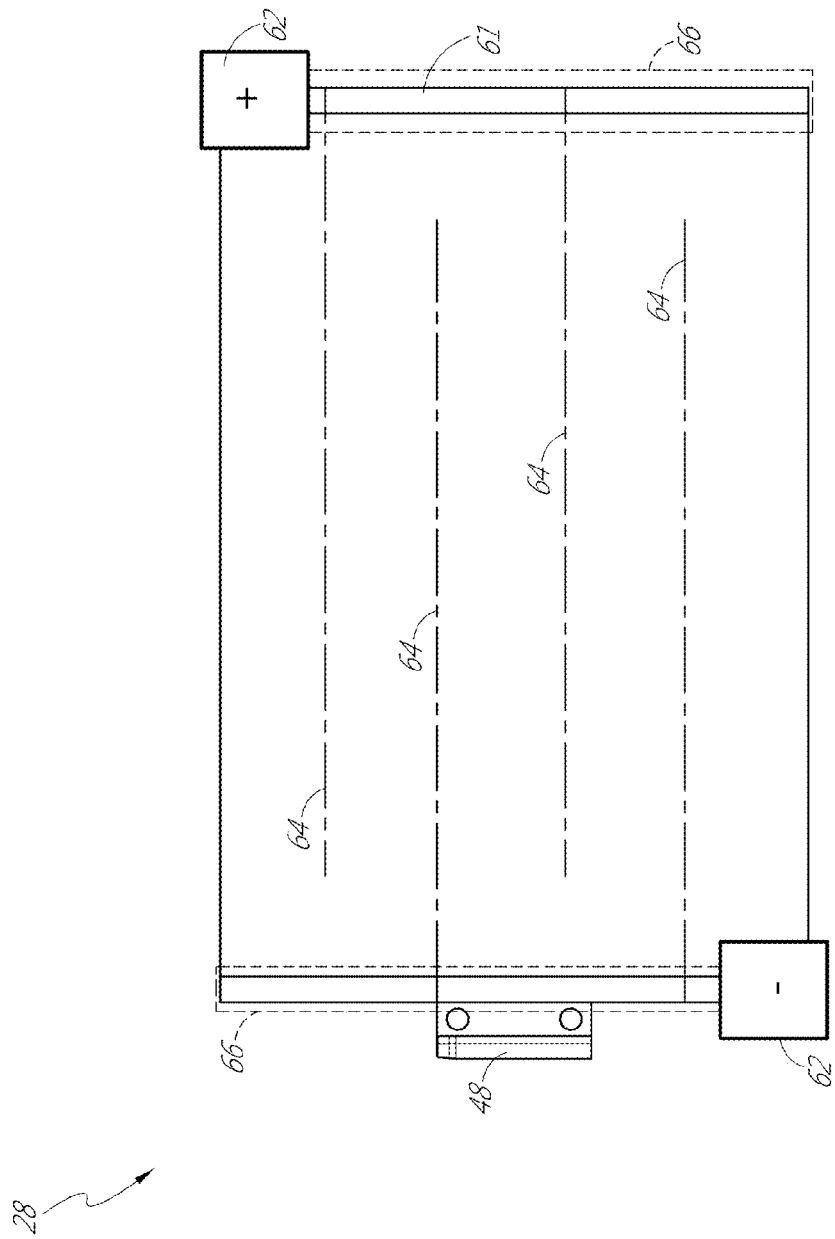
FIG. 13 illustrates an embodiment of a heat spreader.

FIG. 13 illustrates an embodiment of a heat spreader 28. The heat spreader 28 can be connected to a voltage source 62 (e.g., conductor) in any suitable manner as discussed herein, including thermal/electrical elevators 44. The voltage source 62 can drive an electric current through the graphite sheets 42 of the heat spreader 28 as discussed here in to provide the functionality of a resistance heater to the heat spreader 28. To increase the effectiveness of the heat spreader 28 functioning as a resistance heater, length of the conduction path of the electric current through the graphite sheets 42 can be increased or lengthened (e.g. increase the resistance to electric current flow through the graphite sheets 42).

As illustrated in FIG. 13, that heat spreader 28 can have one or more cuts or breaks 64 provided in the heat spreader 28 along a plane 63 parallel to the graphite sheets 42. The breaks 64 can be portions of the heat spreader 28 where the carbon atoms are not covalently bonded in the graphite sheets 42 along the plane 63 parallel to the graphite sheets 42. The breaks 64 can be provided in the heat spreader 28 during manufacture of the graphite sheets 42 and/or after the manufacturer of the graphite sheets 42, such as for example, by cutting or breaking the graphite sheets (e.g., breaking covalent bonds) along, for example, the breaks 64 illustrated in FIG. 13.

When an electric current is driven through the graphite sheets 42, the electric current now not only has to travel or conduct from one end to another end of the heat spreader 28, but the electric current also has to travel or conduct along the serpentine path created in the graphite sheets from the positive terminal of the voltage source 62 to the negative terminal of the voltage source 62. While a serpentine path from one corner to an opposite corner of the heat spreader 28 is illustrated, any serpentine path through the heat spreader 28 can be provided. Or any other pattern of breaks 64 can be provided in the heat spreader 28 to increase the path length of the electric current flow through the heat spreader 28.

As illustrated in FIG. 13, the connection 48 and component 61 can be included as discussed herein while providing the serpentine path for current flow. In order to direct the electric current to flow along the serpentine path and not throughout the connection 48 and component 61 (e.g., as discussed herein for a voltage spreader 50 illustrated in FIG. 5) electrical insulation 66 can be provided along portions of the connection 48 and component 61 where electric current flow is not desired. Electrical insulation 66 may still allow for thermal communication (e.g., transfer of thermal energy) as desired between BTMS 10 components.

Figure 14:
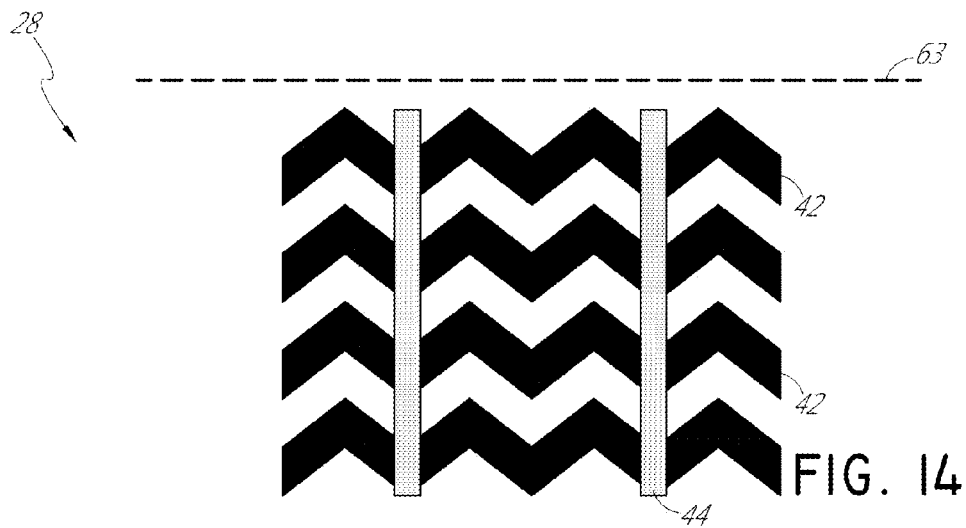
FIG. 14 illustrates an embodiment of a graphite sheet of a heat spreader.
Figure 15:
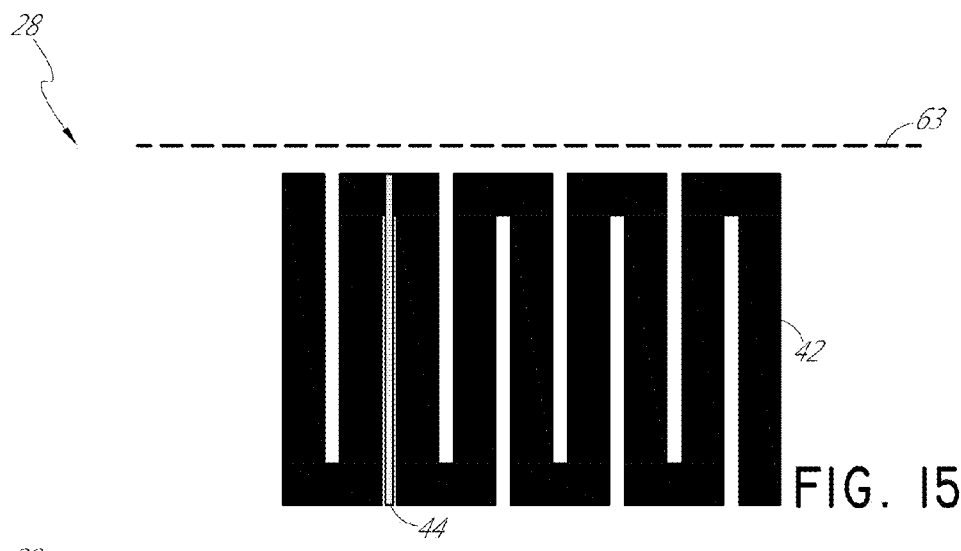
FIG. 15 illustrates an embodiment of a graphite sheet of a heat spreader.
Figure 16:
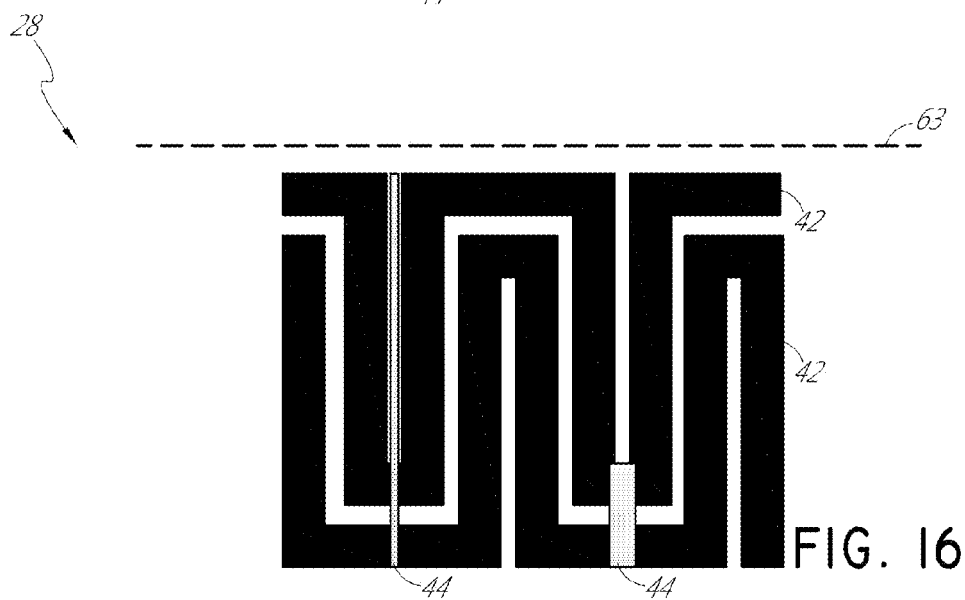
FIG. 16 illustrates an embodiment of a graphite sheet of a heat spreader.

FIGS. 14-16 illustrate embodiments of graphite sheets 42 of a heat spreader 28. As another way to increase the path length of electric current flow through the graphite sheets 42, the graphite sheets 42 within a heat spreader 28 can be "crinkled" as illustrated in FIGS. 14-16. For example, the graphite sheets may have bends, angles, curvatures, and/or zigzags along the plane 63 substantially parallel to the heat spreader 28 as discussed herein. The overall longer length of the graphite sheets 42 themselves relative to a substantially same dimension of the heat spreader 28 increases the path or travel length for the electric current flow to increase resistance heating as discussed herein. The crinkled heat spreaders 28 may incorporate elevators 44 as discussed herein. The dimensions of the graphite sheets 42 to the dimensions of the elevators 44 are not necessarily drawn to scale.

As illustrated in FIG. 14, the graphite sheets 42 may zigzag along the plane 63 substantially parallel to the heat spreader 28 such that the graphite sheets 42 do not extend fully through a dimension of the heat spreader orthogonal to the plane 63 parallel to the heat spreader 28 (e.g., not extend through a thickness of the heat spreader 28 to extend between the sides or faces of the heat spreader 28 such as contact portion(s) 30). Accordingly, elevators 44 can transfer heat or electrons between the faces of the heat spreader 28 (e.g., orthogonal to the plane 63 substantially parallel to the heat spreader 28).

As illustrated in FIG. 15, a graphite sheet may zigzag along the plane 63 substantially parallel to the heat spreader 28 such that the graphite sheet 42 extends fully through a dimension of the heat spreader orthogonal to the plane 63 parallel to the heat spreader 28 (e.g., through a thickness of the heat spreader 28 to extend between the sides or faces of the heat spreader 28 such as contact portion(s) 30). Accordingly, heat or electrons can be transferred in an orthogonal or normal direction relative to plane 63 as discussed herein (e.g., between contact portion(s) 30) with less or without elevators 44. As illustrated in FIG. 15, the heat spreader 28 may still use elevators 44 to enhance heat or electron transfer as discussed herein.

As illustrated in FIG. 16, the graphite sheets 42 may zigzag along the plane 63 substantially parallel to the heat spreader 28 such that the graphite sheets 42 do not extend fully through a dimension of the heat spreader orthogonal to the plane 63 parallel to the heat spreader 28 (e.g., not extend through a thickness of the heat spreader 28 to extend between the sides or faces of the heat spreader 28 such as contact portion(s) 30). The pattern of curvature of the graphite sheets 42 may be such that the graphite sheets 42 extend through a substantial portion (e.g., a majority of the thickness orthogonal to the parallel plane 63 of the heat spreader 28). Relatively shorter elevators 44a not extending through the length of the heat spreader 28 can be provided to effectively transfer heat or electrons between the graphite sheets 42 as discussed herein. As illustrated in FIG. 14, the heat spreader 28 can also include elevators 44b as discussed herein that extend through the thickness of the heat spreader 28.

Figure 17:
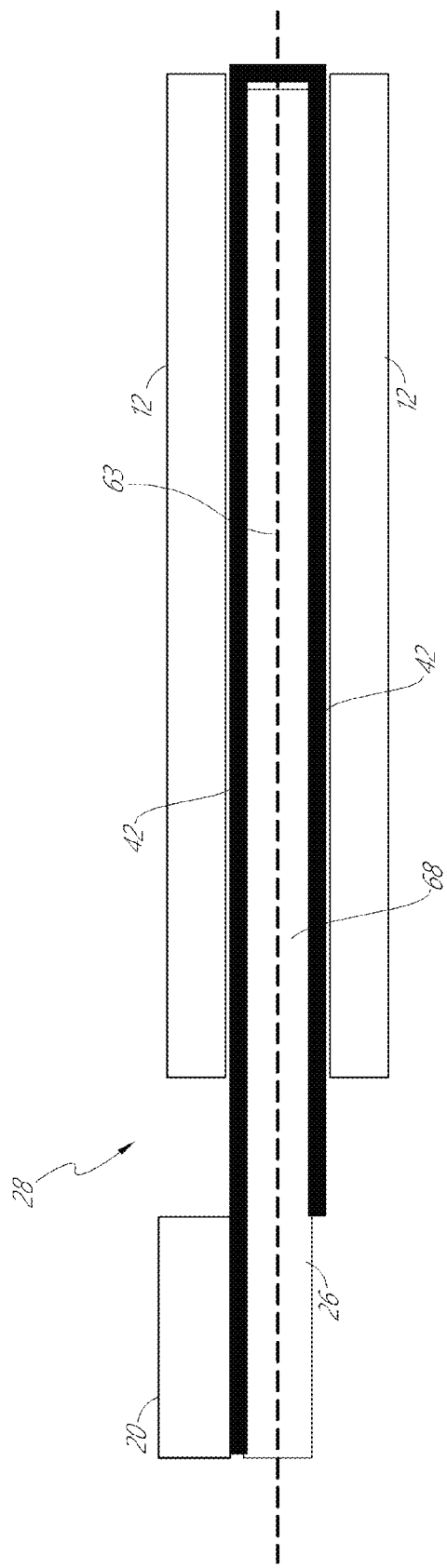
FIG. 17 illustrates an embodiment of a heat spreader with a thermal/electrical substrate.

FIG. 17 illustrates an embodiment of a heat spreader 28 with a thermal/electrical substrate 68. The substrate 68 can be a metallic material having sufficient and/or desirable thermal and/or electrical properties as discussed herein. For example, the substrate 68 can be aluminum, copper, etc.

One or more graphite sheet 42 can be disposed around or on the substrate 68. The number of graphite sheets 42 disposed around the substrate 68 can be determined based on desired thermal/electrical characteristics. For example, the graphite sheets 42 disposed on the substrate 68 can function as a thermal interface material which can contact or connect with the substrate 68 in any suitable manner as discussed herein.

In some embodiments, a single graphite sheet or layer 42 can be disposed on the substrate 68. As illustrated in FIG. 17, the graphite sheet 42 can be disposed, be positioned, or extend around a majority or at least half of the cross-sectional or side perimeter of the substrate 68 shown in FIG. 17. The graphite sheet 42 can extend around one, two, three, or four sides of the substrate 68 such that the graphite sheet 42 extends around at least half of the perimeter of the substrate 68. The graphite sheet 42 can be a continual or monolithic layer or piece around the substrate 68, including at the corners of the substrate 68 as illustrated in FIG. 17. In some embodiments, the graphite sheet 42 may be discrete pieces positioned about the substrate 68 with breaks at, for example, the corners 68 of the substrate.

As illustrated in FIG. 17, the heat spreader 28 can be disposed or positioned between battery cells 12 as discussed herein. The heat spreader 28 can have a fin 26 with a TED 20 attached to the fin 26 as discussed herein. The TED 20 can heat or cool the battery cells 12 via the heat spreader 28 as discussed herein. In some embodiments, a voltage spreader 50 or voltage source 62 as discussed herein can be connected to the heat spreader 28. The graphite sheets 42 disposed on the substrate 68 can function as resistive heaters as discussed herein. The graphite sheets 42 can have breaks 64 as discussed herein to increase the resistance heating capacity. The heat spreader 28 can have any other suitable functionality or components as discussed herein for heat spreaders, including for example connection 46, connection 48, voltage spreader 50, dovetail 58, voltage source 62, component 61, etc.

In some embodiments, a voltage source 62 can be in electrical communication with the substrate 68. The substrate 68 can be of a material (e.g., metallic) that has a higher electrical resistance than the graphite sheets 42. Accordingly, when the battery 14 is heated, the electric current is passed through the substrate 68 to heat the battery cells 12. When the battery 14 is cooled, electric current is run through that TED 20 in a desired polarity such that the main surface 22 of the TED 20 transfers heat away from the graphite sheets 42. As discussed herein, the graphite sheets 42 may have a greater thermal conductivity relative to the substrate 68. The embodiment as illustrated in FIG. 17 may provide effective cooling to the battery cells 12 using the TED 20 while having the ability to provide effective heating to the battery cells 12 using the substrate 68 as a resistive heater.

As discussed herein, in some embodiments, the incorporation of elevators 44 into the pyrolytic graphite sheets 42 or surfaces increases the thermal contact conductivity or decreases the thermal contact resistivity between the graphite sheets 42 and the TEDs 20, device under thermal management (e.g., electrical components, battery 14, battery cells 12) and/or interstitial material (e.g., thermal grease)).

In some embodiments, the Pyrolytic graphite and/or graphite metal composite sheets 42 or surfaces are directly coupled or contacting surfaces or portions of the electrical components (e.g., cells 12) and/or TEDs 20. In some embodiments, the surfaces of each are indirectly coupled or contacting each other via interstitial material (e.g., thermal grease). In some embodiments, the surfaces of the graphite sheets 42, graphite metal composite, electrical components (e.g., cells 12) and/or TEDs 20 are finished to increase thermal contact conductivity and/or decrease thermal contact resistivity between them.

In certain embodiments, advantages of providing or implementing such a graphite (e.g., Pyrolytic) heater/heat sink include, but are not limited to:

The possibility of thermoelectric cooling and high power resistive heating
Saves cost
Light Weight
Withstands high temperatures
Simple, Reliable
Can be die cut and adhesive backed (e.g., graphite cut in irregular shapes)
Relatively high thermal conductivity (e.g., relative to metals)
Environmentally friendly (pure carbon and metal)

In certain embodiments, advantages of providing or implementing a heater/heat sink battery thermal management application or system include, but are not limited to:

No heat sink/heater flatness concern due to flexibility and thickness
Heating enables lithium ion start-stop battery pack to be downsized (e.g., less total battery cells), saving cost and weight
Improves low temperature performance and enables start-stop batteries to be more competitive with lead acid battery
Thermoelectric cooling enables lithium ion start-stop batteries to be a drop in replacement of lead acid batteries and thus more competitive From a perspective of the components described herein, the combination of thermally conductive graphite (e.g., Pyrolytic) or a graphite metal composite, a thermoelectric device (e.g., module, system) and a means (e.g., voltage spreader, power source) to provide a voltage differential across the graphite or a portion of the graphite (e.g., sheet, surface) to provide a high capacity heating function (e.g., resistive, Joule heating) can be applicable to many different areas of thermal management outside of heating and cooling automotive batteries. Automotive battery thermal management is just one specific example. Other applicable areas are, but are not limited to, electronics, energy conversion and storage, human comfort (e.g., climate-control), medical devices, aerospace, and automotive applications.

Embodiments of Battery Thermal Management Systems

Figure 18:
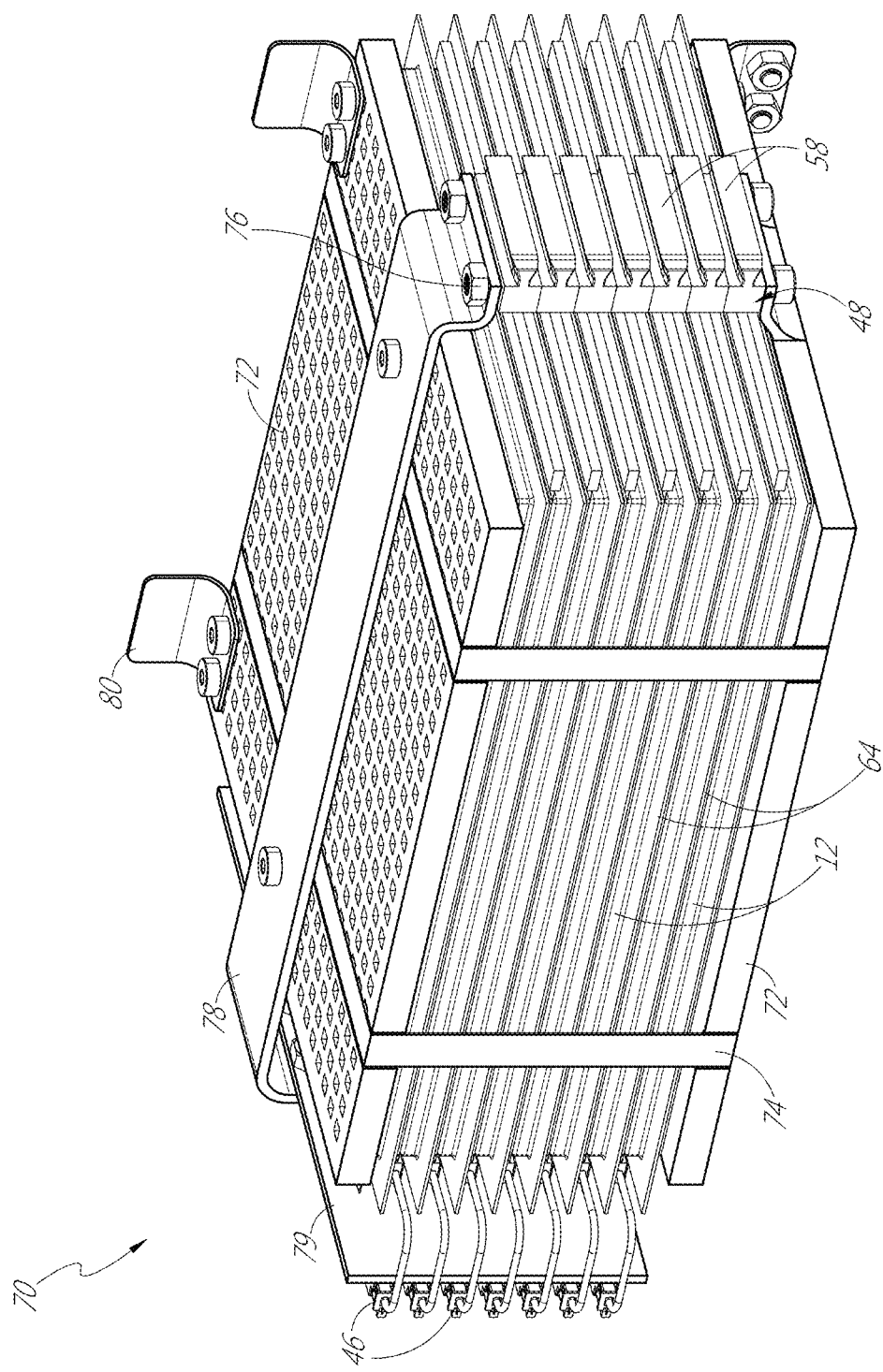
FIG. 18 illustrates an embodiment of a stack of battery cells and heat spreaders.

FIG. 18 illustrates an embodiment of a stack or assembly 70 of battery cells 12 and heat spreaders 28. The battery cells 12 can be stacked with heat spreaders 28 in between the battery cells 12 as discussed herein to provide thermal management to the battery cells 12. The stack 70 can be positioned between support plates 72. The support plates 72 can provide structural integrity as well as any desired thermal conductivity/insulation for the battery cells 12. The support plates 72 of the stack 70 can be secured using straps 74.

The stack 70 of battery cells and heat spreaders 28 can be further secured via the connection 48. For example the connection 48 can include bolt holes that allow bolts 76 to pass all of the aligned bolt holes of the connections 48. The bolts 76 can further physically fix the stack 70 of the battery cells in the heat spreaders 28. Any suitable connection, including as discussed herein, can be used at connections 48 to facilitate securing the assembly 70.

A heater busbar 78 may also be secured to the stack 70 via a connection to the support plates 72 as well as being secured to the connections 48 via the bolts 76. The stack 70 can be housed within or in case by a battery case 16 as discussed herein. The stack 70 can connect, attach, mate, and/or engage with the battery case 16 in any suitable manner, including via support brackets 80 that can be attached to the support plates 72 as well as the battery case 16.

A printed circuit board (PCB) 79 including a controller 36 as discussed herein can be attached or fixed to the heater busbar 78 as well as any other suitable connection to the stack 70. The printed circuit board 79 can be connected to the electrical connections 46 as discussed herein. The PCB 79 and/or controller 36 can be one or more controllers (thermal management controller or battery controller) that control functions of any of the BTMS 10 components discussed herein, including functionality of the battery cell 12, battery 14, heat source and/or heatsink system 32, TE thermal management system 34, power source 38, and/or sensors 40. In some embodiments, the PCB 79 and/or controller 36 can be connected such that data or conditions monitored by the controller 36 can be used to regulate and control the battery cell 12, battery 14, heat source and/or heatsink system 32, TE thermal management system 34, power source 38, and/or sensors 40 to optimize the system efficiency.

FIGS. 19-22 illustrate an embodiment of a battery case 16 with a thermal interface 82 and a thermal window 84. As discussed herein, in some embodiments, the connection 48 can include a tapered dovetail shape 58. The dovetail-shaped connection 58 is configured to be coupled to a corresponding female shaped dovetail coupling 86 or posterior surface forming the thermal interface 82 with a surface of a TED 20 to provide thermal communication between the device under thermal management (e.g., battery 14, cells 12) and a TED 20 positioned outside of the case 16.

As illustrated in FIGS. 19-22, in some embodiments, the thermal interface 82 includes posterior surface 86 of the dovetail connection 58 or coupling in thermal communication with a TED 20 via a thermal window 84 or opening in the battery case 16 or shell of the electrical device (e.g., battery 14). In some embodiments, a thermally conductive material or a thermal substrate 88 (e.g., a copper surface or plate) is positioned in the thermal window 84 between a TED 20 and the dovetail coupling 86. The thermal substrate 88 can transfer thermal energy in and out of the battery case 16 while providing a physical barrier into the battery case 16 (e.g., enclosing the battery cells 12 in the battery case 16).

As illustrated in FIGS. 10-12 and 19-22, the connection 48 can include a tapered dovetail configuration 58 in some embodiments. However, the connection 48 can include any suitable shape or configuration (e.g., square, rectangular, polygonal, triangular. The connection 48, attachment, or coupling between the Pyrolytic graphite sheets 42 and the battery case 16 and/or the TED 20 is not limited to a mechanical male-female connection or joint. Rather, the connection 48 can include any suitable configuration or manner (e.g., adhesives, nuts and bolts, screws, nails, press-fit, or interference fit) such that they are in electrical and/or thermal communication as discussed herein. Further, the connection 48 can be attached to the graphite sheets 42 in any suitable manner (e.g., over-mold, press-fit).

Figure 22:
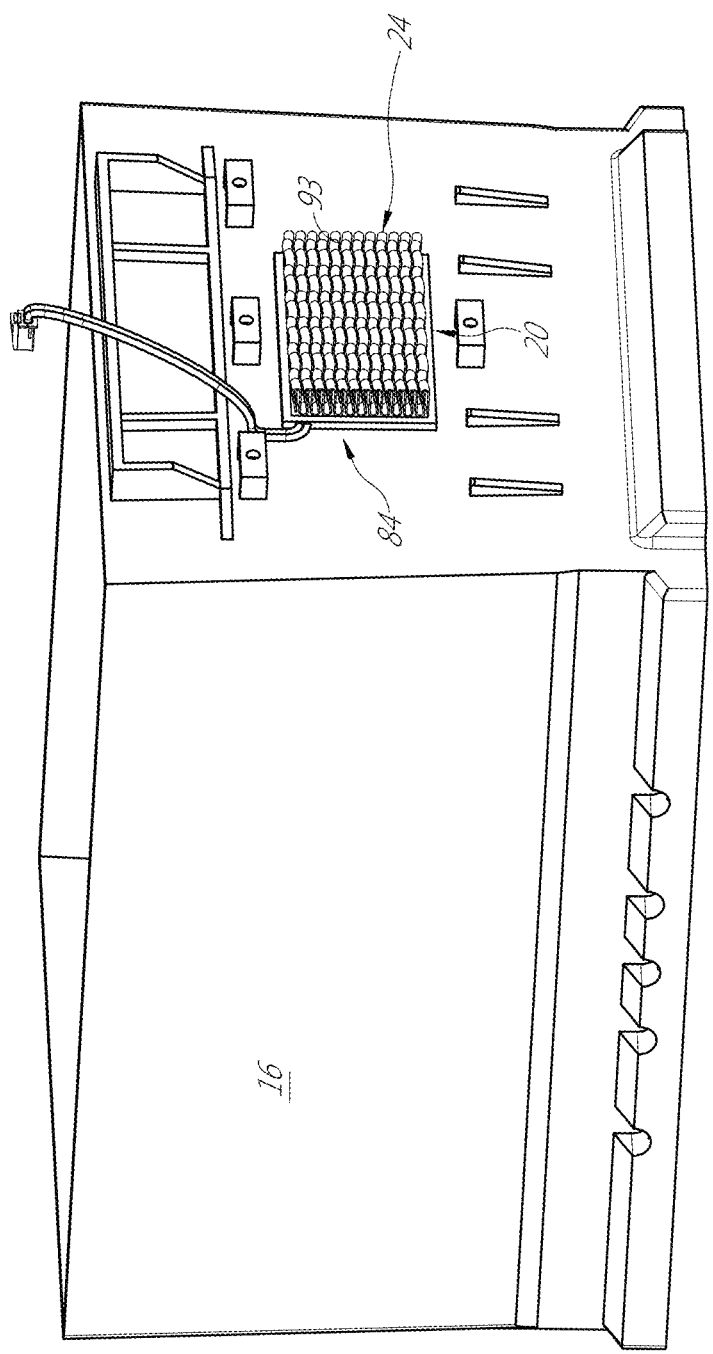
FIG. 22 illustrates an embodiment of a battery case with a thermal interface and a thermal window.

The posterior surface 86 of the dovetail connection 58 can be in direct thermal communication (e.g., surface to surface contact) or indirect thermal communication (e.g., via the copper surface 88) with a main side 22 of a TED 20 positioned outside of a battery case 16 as illustrated in FIG. 22. While one TED 20 is illustrated in FIG. 22, multiple TEDs 20 can be provided using methods discussed herein for greater thermal management, including thermally managing individual heat spreaders 28 paired with an individual TED 20 (see for example, FIG. 4). As discussed herein, thermal grease or other interstitial materials may also be used between the components.

In some embodiments, the battery case 16 does not comprise a thermal window 84 and/or thermally conductive material in the window, as a Pyrolytic graphite heat spreader and resistance heater 28 can be provided in some embodiments without a TED 20 or TE thermal management system 34.

FIGS. 23-25 illustrate an embodiment of an air duct 90 and blower 92 system or assembly. The air duct 90 and blower 92 system can pull and/or push air across a waste side or surface 24 of a TED 20 as discussed herein. As illustrated in FIG. 22, the waste side 24 of the TED 20 can include a waste heat exchanger 93 (e.g., an air heat exchanger). In some embodiments, duct 90 and other air flow components can be optimized or sized to reduce pressure loss across the TED 20 and/or duct 90 and provide even air distribution or air pull.

As illustrated in FIG. 24, the air blower 92 can be attached or connected to the duct 90 to draw or pull air across the TED 20. Integrated controls can provide a switch to either push or pull air across the TED 20. In a cooling mode or heating mode, heated or cooled, respectively, waste air can be pulled or pushed toward or away the blower 92 and exited or allowed to escape through a blower outlet/inlet 94 of the air blower 92 or through a duct outlet/inlet 96. In some embodiments, the waste air can be vented to the outside environment, outside a housing, shell or enclosure the battery 14 is positioned in, or into another conduit (e.g., waste heat removal system) connected to the blower outlet/inlet 94 to provide heated or cooled air as needed (e.g., for heating or cooling seats and/or a passenger compartment, etc.).

As illustrated in FIG. 25, the duct outlet/inlet 96 can include flappers 98. The flappers 98 can be activated (e.g., open) via a thermal diode. In some embodiments, the flappers 98 stay closed unless the blower 92 is running. By the flappers 98 staying closed unless the blower 92 is running, the waste side 24 of the TED 20 can be insulated from ambient temperatures (e.g., heating of the TED 20 is inhibited). In some embodiments, the duct 90 can be insulated to further aid in insulating the TED 20.

In some embodiments, the blower 92 pulls the air across the TED 20 rather than pushes. When the air is pulled by the fan or air blower 92, rather than pushed, the air does not need to travel through, for example, the blower 92 before reaching the waste side 24 of the TED 20. The air is instead pulled across the waste side 24 of the TED 20 and exhausted at the blower outlet/inlet 94. For example, the air is not heated by the heat from the motor of the blower 92 when the air is pulled. Pulling the air can be used in the cooling mode.

In some embodiments, the blower 92 pushes the air across the TED 20 rather than pulls. When the air is pushed by the fan or air blower 92, rather than pulled, the air travels through the blower 92 before reaching the waste side 24 of the TED 20. The air is instead pulled across the waste side 24 of the TED 20 and exhausted at the duct outlet/inlet 96. For example, the air is heated by the heat from the motor of the blower 92 when the air is pushed to increase efficiency (e.g., preheat the air as desired). Pushing the air can be used in the heating mode. In some embodiments, if preheating the air is not desired in the heating mode, the air can be pulled by the air blower 92 as discussed herein.

In the context of a vehicle, the air is not heated by the exhaust system before being pushed across the waste side 24 of the TED 20 when the air is pulled. In such an embodiment, the inlet for the air is near, by, or, at the heat exchangers or fins 93 of the TED 20 (e.g., outlet/inlet 96) and the outlet/inlet 94 for the air is at the blower 92. When the air is pushed, the inlet is at the outlet/inlet 94 of the blower 92 and the outlet is near, by, or, at the heat exchangers or fins 93 of the TED 20 (e.g., outlet/inlet 96). In some embodiments, when the air is pushed and the outlet is near, by, or, at the heat exchangers or fins 93 of the TED 20, an additional conduit can be provided to transport the waste heat away from the TED 20, the battery cell(s) 12, and/or battery case 16. When the air is pulled, the air can be exhausted out the outlet/inlet 96 of the blower 92. In some embodiments, this reduced complexity of the system because the air can be exhausted out the outlet/inlet 96 without an additional conduit or waste heat removal system. In some embodiments, the air temperature is half a degree cooler when pulled versus pushed across the heat exchangers or fins 93 of the TED 20.

In some embodiments, connections and controls for managing the blower 92 and duct 90 can be integrated into the controller 36. In some embodiments, the PCB 79 and/or controller 36 can regulate the blower 92 output to optimize the system efficiency (e.g., increase & decrease the airflow, power, or motor speed of the blower 92 to match cooling or heating requirements of the battery cells 12). In some embodiments, the PCB 79 and/or controller 36 can be connected such that data or conditions monitored by the controller 36 can be used to regulate the blower 92 output to optimize the system efficiency.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the inventions are susceptible to various modifications, and alternative forms, specific examples thereof have been shown in the drawings and are herein described in detail. It should be understood, however, that the inventions are not to be limited to the particular forms or methods disclosed, but to the contrary, the inventions are to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "passing a suspension line through the base of the tongue" include "instructing the passing of a suspension line through the base of the tongue." It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount. Features of embodiments disclosed herein preceded by a term such as "approximately", "about", and "substantially" as used herein represent the feature with some variability that still performs a desired function or achieves a desired result for that feature.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:

1. A thermoelectric battery thermal management system configured to manage temperature of a battery cell, the system comprising:
a heat spreader in thermal communication with a temperature sensitive region of a battery cell, the heat spreader comprising:
pyrolytic graphite in thermal communication with the temperature sensitive region of the battery cell, the pyrolytic graphite comprising a plurality of graphite layers extending substantially in parallel along the heat spreader and configured to transfer thermal energy and electric current along a plane substantially parallel to the graphite layers;
a plurality of thermal elevators between the plurality of graphite layers, the thermal elevators configured to transfer thermal energy between the plurality of graphite layers and configured to transfer thermal energy substantially orthogonal to the plane; and
a conductor in thermal communication with the pyrolytic graphite and the plurality of thermal elevators, the conductor in electrical communication with the pyrolytic graphite to heat the battery cell upon application of electric current through the pyrolytic graphite via the conductor;
a thermoelectric device comprising a main side and a waste side, the thermoelectric device configured to transfer thermal energy between the main side and the waste side of the thermoelectric device upon application of electric current to the thermoelectric device, wherein the main side of the thermoelectric device is in thermal communication with the heat spreader to heat or cool the battery cell by adjusting a polarity of electric current delivered to the thermoelectric device; and
a thermal management controller configured to operate in a heating mode or a cooling mode,
wherein in the heating mode, the battery cell is heated by the heat spreader transferring thermal energy to the temperature sensitive region of the battery cell when electric current is applied to the heat spreader via the conductor, when electric current is applied to the thermoelectric device in a first polarity, or when electric current is applied to both the heat spreader via the conductor and the thermoelectric device in the first polarity, and
wherein in the cooling mode, the battery cell is cooled by the heat spreader transferring thermal energy away from the temperature sensitive region of the battery cell when electric current is applied to the thermoelectric device in a second polarity.

2. The system of claim 1, wherein the battery cell and the heat spreader are positioned in a battery case, and wherein the conductor is configured to attach to the battery case to physically fix the heat spreader relative to the battery case.

3. The system of claim 2, further comprising a thermal interface on the battery case and configured to mate with the conductor, wherein the conductor comprises a first mechanical connector, wherein the thermal interface comprises a second mechanical connector configured to mate with the first mechanical connector to attach the conductor to the battery case.

4. The system of claim 3, wherein the battery case comprises a thermal window configured to transfer thermal energy in and out of the battery case, the thermal window in thermal communication with the thermal interface.

5. The system of claim 4, wherein the battery case comprises a thermal substrate in the thermal window, the thermal substrate configured to transfer thermal energy in and out of the battery case while providing a physical barrier into the battery case.

6. The system of claim 5, wherein the main side of the thermoelectric device is in thermal communication with the thermal substrate to provide the thermal communication between the main side of the thermoelectric device and the heat spreader via the conductor and the thermal interface.

7. The system of claim 2, further comprising a blower and duct assembly attached to the battery case and configured to push or pull air across the waste side of the thermoelectric device, wherein the thermal management controller is configured to optimize system efficiency such that airflow from a blower of the blower and duct assembly is increased or decreased to match heating or cooling requirements of the battery cell.

8. A battery thermal management system configured to heat or cool a battery cell, the system comprising:
a heat spreader in thermal communication with a battery cell, the heat spreader comprising:
a pyrolytic graphite sheet configured to transfer thermal energy and electric current along the pyrolytic graphite sheet; and
a conductor in thermal and electrical communication with the pyrolytic graphite sheet, the conductor in electrical communication with the pyrolytic graphite sheet to heat the battery cell upon application of electric current to the pyrolytic graphite sheet via the conductor, the conductor in thermal communication with the pyrolytic graphite sheet to transfer thermal energy to and from the pyrolytic graphite sheet; and a thermoelectric device comprising a main side and a waste side, the thermoelectric device configured to transfer thermal energy between the main side and the waste side of the thermoelectric device upon application of electric current to the thermoelectric device, wherein the main side of the thermoelectric device is in thermal communication with the heat spreader to heat or cool the battery cell by adjusting a polarity of electric current delivered to the thermoelectric device, wherein the battery cell is heated by the heat spreader transferring thermal energy to the battery cell when electric current is applied to the heat spreader via the conductor, or when electric current is applied to the thermoelectric device in a first polarity, or when electric current is applied to both the heat spreader via the conductor and the thermoelectric device in the first polarity, and wherein the battery cell is cooled by the heat spreader transferring thermal energy away from the battery cell when electric current is applied to the thermoelectric device in a second polarity.

9. The system of claim 8, wherein the heat spreader further comprises a metallic substrate in thermal communication with the pyrolytic graphite sheet, wherein the pyrolytic graphite sheet is in thermal communication with the battery cell such that the pyrolytic graphite sheet functions as thermal interface between the battery cell and the metallic substrate.

10. The system of claim 9, wherein the pyrolytic graphite sheet extends along a surface of the metallic substrate on at least two sides of the metallic substrate.

11. The system of claim 9, wherein the battery cell is heated by the heat spreader transferring thermal energy to the battery cell when electric current is applied to metallic substrate via the conductor.

12. A heat spreader assembly for managing temperature of an electrical device, the heat spreader assembly comprising:
    a graphite sheet in thermal communication with an electrical device, the graphite sheet configured to transfer thermal energy and electric current along the graphite sheet; and
    a conductor in thermal and electrical communication with the graphite sheet, the conductor in electrical communication with the graphite sheet to heat the electrical device upon application of electric current to the graphite sheet via the conductor, the conductor in thermal communication with the graphite sheet to transfer thermal energy to and from the graphite sheet,
    wherein the electrical device is heated by the graphite sheet transferring thermal energy to the electrical device when electric current is applied to the heat spreader assembly via the conductor, and
    wherein the electrical device is cooled by the graphite sheet transferring thermal energy away from the electrical device.

13. The assembly of claim 12, further comprising an other conductor in thermal and electrical communication with the graphite sheet, wherein the electrical device is heated when electric current is applied to the graphite sheet via the conductor and the other conductor such that electric current flows along the graphite sheet.

14. The assembly of claim 13, wherein the graphite sheet comprises a first side and a second side, the first side substantially opposite the second side, and wherein the conductor is on the first side, and the other conductor is on the second side.

15. The assembly of claim 13, wherein the other conductor comprises an electrical junction configured to electrically connect to a printed circuit board comprising a controller configured to manage temperature of the electrical device, the electrical junction configured to deliver electric current to the heat spreader assembly.

16. The assembly of claim 12, wherein a thermoelectric device is in thermal communication with the graphite sheet, wherein the electrical device by the graphite sheet when electric current is applied to the thermoelectric device in a first polarity, and wherein the electrical device is cooled by the graphite sheet when electric current is applied to the thermoelectric device in a second polarity.

17. The assembly of claim 12, wherein the graphite sheet comprises a break in covalent bonds in the graphite sheet, the break configured to increase a travel path for electric current through the graphite sheet to increase resistive heating capacity of the graphite sheet.

18. The assembly of claim 12, wherein the graphite sheet is crinkled to increase a length of the graphite sheet, the increased length of graphite sheet configured to increase a travel path for electric current through the graphite sheet to increase resistive heating capacity of the graphite sheet.

19. The assembly of claim 12, wherein the conductor extends substantially an entirety of a dimension of the graphite sheet to provide structural integrity to the graphite sheet.

20. The assembly of claim 12, further comprising at least one other graphite sheet in thermal and electrical communication with the conductor, wherein the conductor is in electrical communication with the at least one other graphite sheet to heat the electrical device upon application of electric current to the at least one other graphite sheet via the conductor, the conductor in thermal communication with the at least one other graphite sheet to transfer thermal energy to and from the at least one other graphite sheet.

21. The assembly of claim 20, wherein the graphite sheet and the at least one other graphite sheet extend substantially in parallel in the heat spreader assembly.

22. The assembly of claim 20, further comprising a thermal connector between the graphite sheet and the at least one other graphite sheet, the thermal connector configured to transfer thermal energy between the graphite sheet and the at least one other graphite sheet.

23. A method of manufacturing a battery thermal management system for heating or cooling a battery cell, the method comprising:
    thermally connecting a heat spreader to a battery cell, the heat spreader comprising:
        a pyrolytic graphite sheet configured to transfer thermal energy and electric current along the pyrolytic graphite sheet; and
        a conductor in thermal and electrical communication with the pyrolytic graphite sheet, the conductor in electrical communication with the pyrolytic graphite sheet to heat the battery cell upon application of electric current to the pyrolytic graphite sheet via the conductor, the conductor in thermal communication with the pyrolytic graphite sheet to transfer thermal energy to and from the pyrolytic graphite sheet; and
    thermally connecting a main side of a thermoelectric device to the heat spreader to heat or cool the battery cell by adjusting a polarity of electric current delivered to the thermoelectric device, the thermoelectric device configured to transfer thermal energy between the main side and a waste side of the thermoelectric device upon application of electric current to the thermoelectric device,
wherein the battery cell is heated by the heat spreader transferring thermal energy to the battery cell when electric current is applied to the heat spreader via the conductor, or when electric current is applied to the thermoelectric device in a first polarity, or when electric current is applied to both the heat spreader via the conductor and the thermoelectric device in the first polarity, and
wherein the battery cell is cooled by the heat spreader transferring thermal energy away from the battery cell when electric current is applied to the thermoelectric device in a second polarity.

24. The method of claim 23, further comprising positioning the battery cell and the heat spreader in a battery enclosure and connecting the conductor with the battery enclosure to secure the heat spreader to the battery enclosure.

25. The method of claim 24, further comprising connecting a thermal interface to the battery enclosure, the thermal interface configured to mate with the conductor, wherein the conductor comprises a first mechanical connector, wherein the thermal interface comprises a second mechanical connector configured to mate with the first mechanical connector to attach the conductor to the battery enclosure.

26. The method of claim 24, further comprising positioning a thermal window in the battery enclosure, the thermal window configured to transfer thermal energy in and out of the battery enclosure.

27. The method of claim 26, further comprising connecting a thermal substrate to the battery enclosure in the thermal window, the thermal substrate configured to transfer thermal energy in and out of the battery enclosure while providing a physical barrier into the battery enclosure.

28. The method of claim 27, further comprising thermally connecting the thermoelectric device with the thermal substrate to thermally connect the thermoelectric device to the heat spreader.

29. The method of claim 24, further comprising positioning the thermoelectric device outside of the battery enclosure.

30. The method of claim 24, further comprising connecting a blower and duct assembly to the battery enclosure, the blower and duct assembly configured to push or pull air across the waste side of the thermoelectric device, and further comprising connecting a blower in the blower and duct assembly, the blower configured to optimize system efficiency such that airflow is increased or decreased to match heating or cooling requirements of the battery cell.

* * * * *